US010620892B2

(12) United States Patent
Sumi et al.

(10) Patent No.: US 10,620,892 B2
(45) Date of Patent: Apr. 14, 2020

(54) INFORMATION PROCESSING APPARATUS THAT DISPLAYS A PRINT SETTING SCREEN BASED ON INFORMATION OF A PRINTING APPARATUS IN A FORMAT INTERPRETABLE IN A FIRST PROGRAM LAYER AND PROCESSING METHOD THEREOF

(71) Applicant: CANON KABUSHIKI KAISHA, Tokyo (JP)

(72) Inventors: Naoki Sumi, Kawasaki (JP); Tomohiro Suzuki, Kawasaki (JP); Kiyoshi Umeda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/584,209

(22) Filed: May 2, 2017

(65) Prior Publication Data
US 2017/0235533 A1 Aug. 17, 2017

Related U.S. Application Data

(63) Continuation of application No. 14/743,459, filed on Jun. 18, 2015, now Pat. No. 9,671,984.

(30) Foreign Application Priority Data

Jun. 30, 2014 (JP) ................. 2014-135179

(51) Int. Cl.
G06F 3/12 (2006.01)
B41J 2/415 (2006.01)
(Continued)

(52) U.S. Cl.
CPC ........ G06F 3/1256 (2013.01); B41J 2/04501 (2013.01); B41J 2/4155 (2013.01);
(Continued)

(58) Field of Classification Search
CPC ........ G06F 3/122; G06F 3/1224; G06F 3/125; G06F 3/1244; G06F 3/1285;
(Continued)

(56) References Cited

U.S. PATENT DOCUMENTS 7,412,486 B1 8/2008 Petrack et al.
7,978,909 B2 7/2011 Umeda
(Continued)

FOREIGN PATENT DOCUMENTS

JP 2006-350557 12/2006
JP 2007058783 A 3/2007
(Continued)

OTHER PUBLICATIONS

Japanese Office Action issued in corresponding Japanese Application No. 2014135179 dated May 7, 2018.
(Continued)

Primary Examiner — Iriana Cruz
(74) Attorney, Agent, or Firm — Venable LLP

(57) ABSTRACT

An embodiment of this invention solves memory shortage that occurs in enlargement processing of an image because a web application holds data of an image or the like not as binary data but as character string data. In the embodiment, a processor in an information processing apparatus executes a program including a first program layer with an instruction set to be interpreted and executed by the processor and a second program layer with an instruction set interpreted in advance by a unit other than the processor in the following way. That is, the first program layer draws an image, and divides and enlarges the drawn image using a memory. Image data of each of a plurality of images obtained by the division and enlargement is output from the second program layer to an external device.

25 Claims, 16 Drawing Sheets

(51) Int. Cl.
  *B41J 2/045* (2006.01)
  *G06F 16/178* (2019.01)
  *B41J 2/005* (2006.01)
  *B41J 2/02* (2006.01)

(52) U.S. Cl.
  CPC ............. *G06F 3/122* (2013.01); *G06F 3/125* (2013.01); *G06F 3/1224* (2013.01); *G06F 3/1244* (2013.01); *G06F 3/1285* (2013.01); *G06F 16/1794* (2019.01); *B41J 2002/0052* (2013.01); *B41J 2002/022* (2013.01)

(58) Field of Classification Search
  CPC .............. G06F 17/30179; G06F 3/1256; B41J 2/4155; B41J 2/04501; B41J 2002/0052; B41J 2002/022
  See application file for complete search history.

(56) References Cited

U.S. PATENT DOCUMENTS

| | | | |
|---|---|---|---|
| 8,374,439 B2 | 2/2013 | Hori | |
| 8,873,090 B2 | 10/2014 | Nakagawa | |
| 9,055,263 B2 | 6/2015 | Umeda et al. | |
| 9,465,571 B2 | 10/2016 | Kato et al. | |
| 9,582,232 B2 | 2/2017 | Umeda et al. | |
| 2007/0003139 A1 | 1/2007 | Gotoh et al. | |
| 2008/0068635 A1* | 3/2008 | Asano | G06F 3/1204 358/1.13 |
| 2010/0115398 A1 | 5/2010 | Yi | |
| 2010/0149091 A1* | 6/2010 | Kota | G06T 11/00 345/156 |
| 2010/0228816 A1* | 9/2010 | Jhou | G06F 3/1203 709/203 |
| 2012/0170064 A1* | 7/2012 | Hibino | G06F 3/1205 358/1.9 |
| 2012/0212766 A1 | 8/2012 | Imamoto | |
| 2014/0092141 A1 | 4/2014 | Takagi et al. | |
| 2015/0363144 A1 | 12/2015 | Suzuki et al. | |
| 2015/0363173 A1 | 12/2015 | Kurokawa et al. | |
| 2015/0365546 A1 | 12/2015 | Umeda et al. | |
| 2015/0378645 A1 | 12/2015 | Kunieda et al. | |
| 2015/0378653 A1 | 12/2015 | Goto et al. | |
| 2015/0379382 A1 | 12/2015 | Mizoguchi et al. | |
| 2015/0379741 A1 | 12/2015 | Obayashi et al. | |

FOREIGN PATENT DOCUMENTS

| | | |
|---|---|---|
| JP | 2008090377 A | 4/2008 |
| JP | 2009020911 A | 1/2009 |
| JP | 2010-010938 | 1/2010 |
| JP | 2010-278708 | 12/2010 |
| JP | 2011107378 A | 6/2011 |
| JP | 2011233034 | 11/2011 |
| JP | 2012108825 A | 6/2012 |
| JP | 2012168637 A | 9/2012 |
| JP | 2012238220 A | 12/2012 |

OTHER PUBLICATIONS

Japanese Office Action issued in corresponding Japanese Application No. 2014135179 dated Aug. 3, 2018.
Japanese Office Action issued in corresponding Japanese Application No. 2018126338 dated Sep. 6, 2019.

* cited by examiner

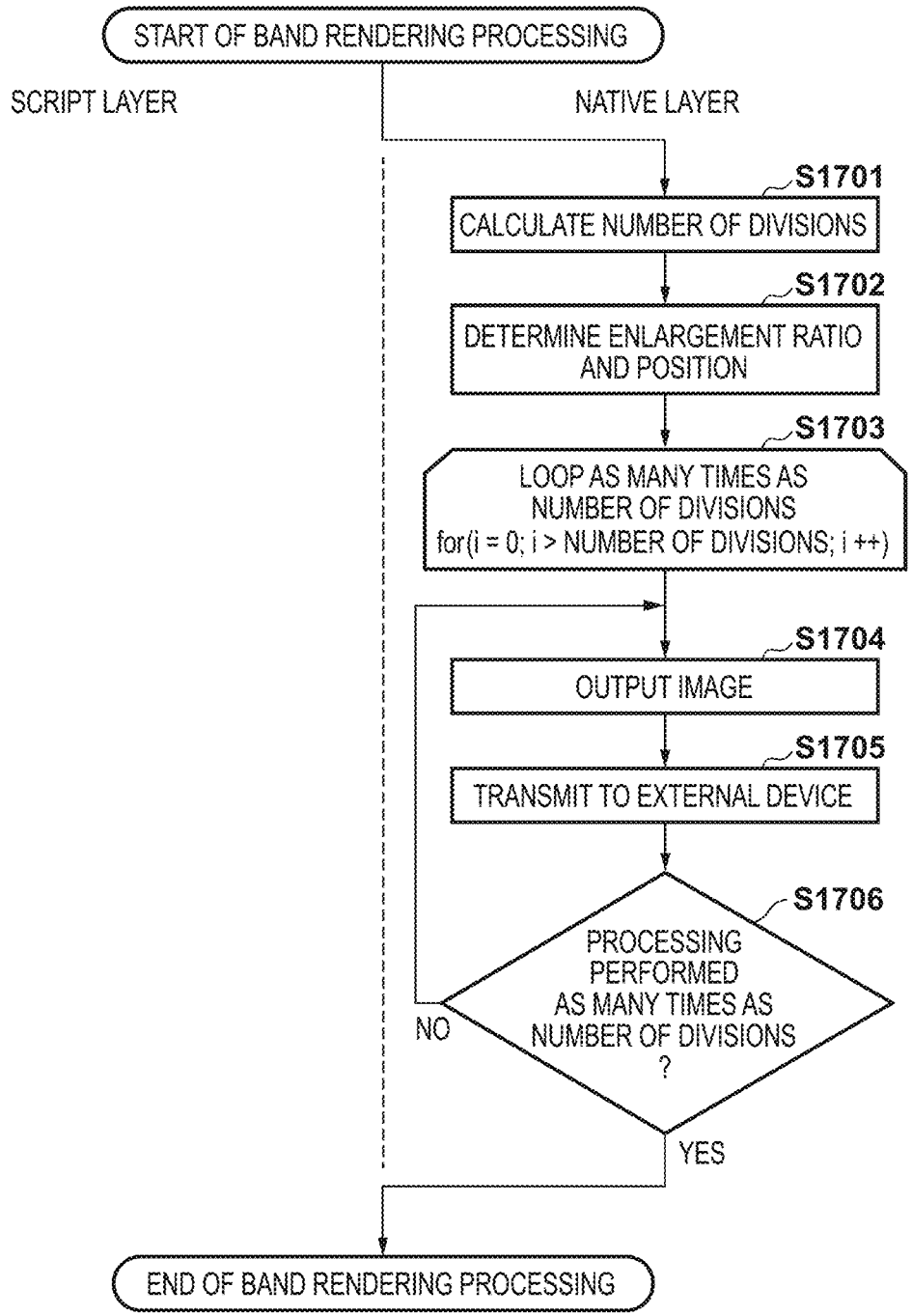

INFORMATION PROCESSING APPARATUS THAT DISPLAYS A PRINT SETTING SCREEN BASED ON INFORMATION OF A PRINTING APPARATUS IN A FORMAT INTERPRETABLE IN A FIRST PROGRAM LAYER AND PROCESSING METHOD THEREOF

BACKGROUND OF THE INVENTION

Field of the Invention

The present invention relates to, for example, rendering processing executed by an information processing apparatus such as a mobile terminal that operates as an external device for an image output apparatus, for example, a printer.

Description of the Related Art

In recent years, multi-function mobile terminals (to be referred to as mobile computers hereinafter) incorporating a camera function have explosively become widespread, and far surpass digital cameras and conventional personal computers (to be referred to as PCs hereinafter) in sales.

Such mobile computer is basically formed from three elements, that is, hardware as the computer itself, an operating system (to be referred to as an OS hereinafter) operating on the hardware, and an application operating on the OS. By using the application, the user can use a function such as a map, mail, or browsing of a Web site on the Internet.

As examples of the form of such application operating on the mobile computer, there are mainly two application forms, that is, a native application and Web application. The features of each application form will be explained below.

The native application is developed by using a development environment and development language which are prepared for each OS. For example, the C/C++ language is used on an OS provided by company A, the Java® language is used on an OS provided by company B, and a different development language is used on an OS provided by company C. In general, the native application is compiled in advance in each development environment, and converted from a so-called high-level language understandable by a human into instruction sets such as an assembler interpretable by the CPU of the computer. Thus, the ordinary native application has an advantage that it is possible to perform an operation at high speed since the CPU directly interprets instructions.

On the other hand, the Web application indicates an application operating on a Web browser which is normally incorporated in an OS on each computer in recent years. The application is generally developed by using a language such as HTML5, CSS, or JavaScript® so that the Web browser can interpret the application. These languages are Web standard languages. Therefore, if a Web application is described using the Web standard language, it can operate in any environment where the Web browser operates.

The above-described recent mobile computer integrates a high-resolution camera. The mobile computer is carried by the user daily and also includes a memory capable of storing thousands of photos. Hence, the user can easily enjoy photo taking at a very high frequency. Image processing to, for example, apply filtering for adding monochrome/sepia-toning to a photo image obtained in this way or correct undesirable conditions such as excessive darkness or loss of color balance in a photo is a very important and indispensable function for the user. When developing an application that allows the user to easily execute such image processing without any stress in the two forms described above, the following problems arise.

A native application can execute processing at a high speed, as described above. However, since the native application needs to be developed individually in a development language that changes between OSs, not only the development cost and development time increase, but also the native application cannot readily be provided to users. In addition, the native application needs to be compiled in advance. For this reason, it is difficult to change the UI design of the application at the time of operation or dynamically enhance functions.

Japanese Patent Laid-Open No. 2011-233034 discloses an example of a web application form. In a web application, normally, the main body of the application described in HTML5, CSS or JavaScript® exists on a server outside the mobile computer. Since the application is dynamically downloaded from the server to the mobile computer via the Internet for utilization, the UI design and the like can dynamically be updated without being compiled in advance. However, when executing advanced complex processing, there are only two options for the web application. That is, the web application is executed on the browser by JavaScript® because of restrictions of the browser in terms of security, or executed on the server. JavaScript® is conventionally described as a script of a character string visually recognizable by a human, and can be executed by compiling the script as needed at the time of operation. For this reason, if complex processing is described using JavaScript®, the operation is slow.

If the web application is built so as to execute the processing on the server, time is needed to upload data of a photo or the like existing in the mobile computer to the server via the Internet and download the processing result. This is a large problem for the user who wishes the mobile application to perform stress-free instantaneous processing. In addition, processing on the server cannot be executed offline.

When executing image enlargement processing in image processing, it is necessary to hold pixel values before enlargement and those after enlargement on a memory. Hence, the larger the number of pixels is, the larger the memory utilization is. However, if an application as described above is executed by, for example, a mobile computer, it is difficult to integrate a large-capacity RAM as a memory. In addition, since a web application as described above holds image data not as binary data but as character string data, a large-capacity memory is needed as compared to a case where image data of the same amount is held as binary data. For this reason, a memory of larger capacity is necessary for image enlargement processing, and a short memory readily occurs in the computer.

SUMMARY OF THE INVENTION

Accordingly, the present invention is conceived as a response to the above-described disadvantages of the conventional art.

For example, an information processing apparatus, a processing method, and a storage medium according to this invention are capable of preventing memory shortage and efficiently processing image data even upon executing a hybrid application.

According to one aspect of the present invention, there is provided an information processing apparatus for executing, by a processor, a program including a first program layer with an instruction set to be interpreted and executed by the processor and a second program layer with an instruction set interpreted in advance by a unit other than the processor, comprising: a division enlargement unit configured to execute division processing and enlargement processing for image data, wherein one of the first program layer and the second program layer includes the division enlargement unit.

According to another aspect of the present invention, there is provided a processing method of an information processing apparatus for executing, by a processor, a program including a first program layer with an instruction set to be interpreted and executed by the processor and a second program layer with an instruction set interpreted in advance by a unit other than the processor, comprising: executing division processing and enlargement processing for image data, wherein one of the first program layer and the second program layer includes the division processing and the enlargement processing.

According to still another aspect of the present invention, there is provided a non-transitory computer readable storage medium which stores a computer program to be executed in a processor of an information processing apparatus, wherein the program includes: a first program layer with an instruction set to be interpreted and executed by the processor; and a second program layer with an instruction set interpreted in advance by a unit other than the processor, wherein one of the first program layer and the second program layer executes division processing and enlargement processing for image data.

The invention is particularly advantageous since it is possible to prevent occurrence of memory shortage even in a case where image processing, for example, image enlargement processing requiring a large capacity memory, is executed.

Further features of the present invention will become apparent from the following description of exemplary embodiments (with reference to the attached drawings).

BRIEF DESCRIPTION OF THE DRAWINGS

FIG. 17 is a flowchart illustrating details of band rendering according to the second embodiment.

DESCRIPTION OF THE EMBODIMENTS

Embodiments of the present invention will be described in detail below with reference to the accompanying drawings. Especially in the following embodiment, an arrangement in which a hybrid photo print application (to be described later) is operated on an information processing apparatus, various kinds of image processing are applied to an image selected by the user, and then the image is printed will be explained. Note that typical examples of the information processing apparatus include portable information terminals such as a portable telephone, smartphone, and tablet terminal.

<Description of Hardware Arrangement>

Figure 1:
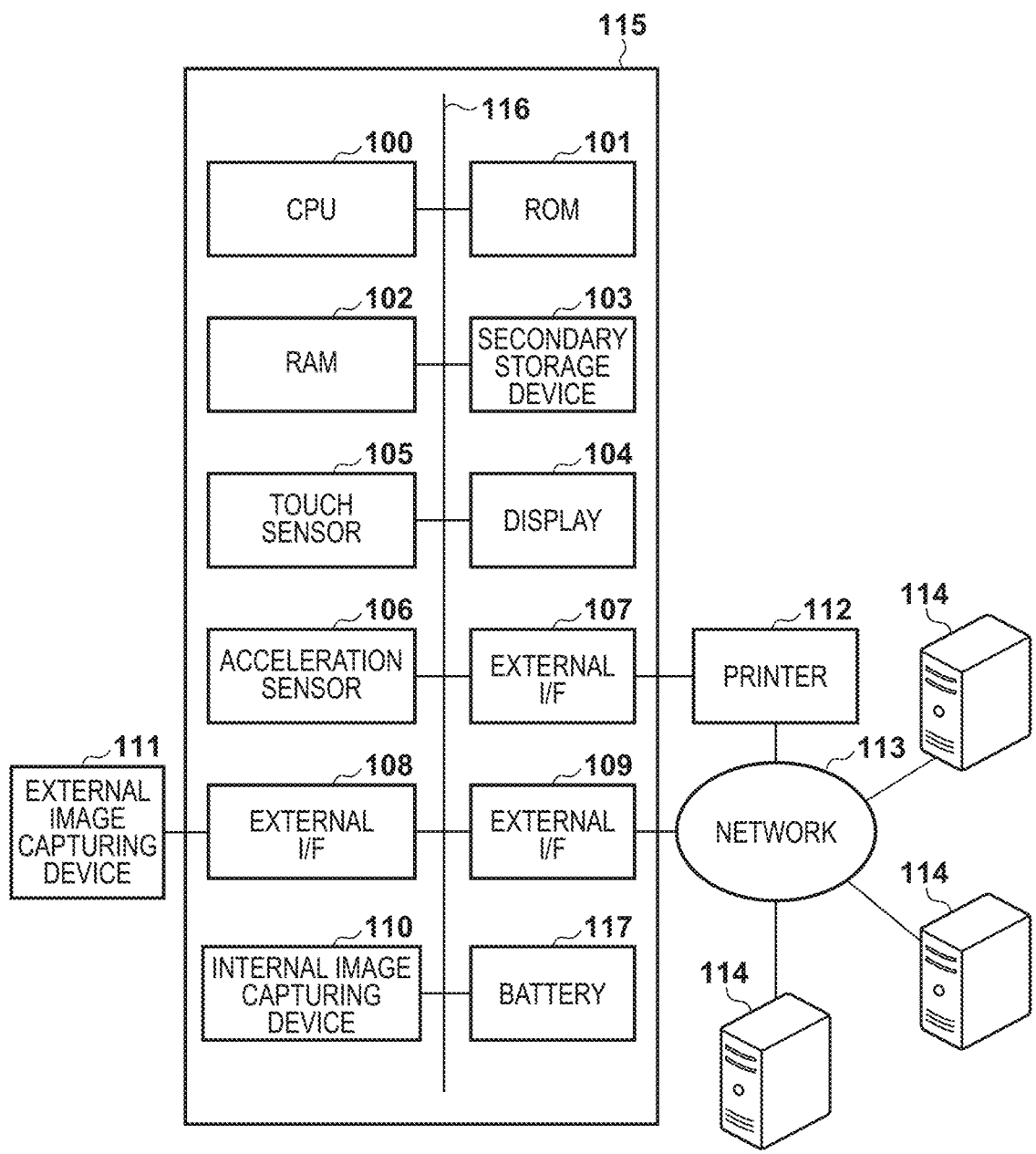
FIG. 1 is a block diagram showing the arrangement of an information processing apparatus according to an exemplary embodiment of the present invention.

FIG. 1 is a block diagram for explaining an example of the arrangement of a portable information terminal such as a smartphone or portable telephone as an information processing apparatus 115 according to an exemplary embodiment of the present invention. Referring to FIG. 1, a CPU (Central Processing Unit/Processor) 100 executes various kinds of processing (to be described below) according to a program. There is one CPU 100 in FIG. 1 but a plurality of CPUs or CPU cores may be included. A ROM 101 stores a program to be executed by the CPU 100. A RAM 102 is a memory for temporarily storing various kinds of information at the time of execution of the program by the CPU 100. Note that FIG. 1 shows an example of a single CPU. However, the information processing apparatus 115 may comprise more than one CPU, that is, may employ a multi-processor configuration.

A secondary storage device 103 such as a hard disk or flash memory is a storage medium for storing various programs and data such as files and databases which hold the processing results of image analysis and the like. A display 104 displays a UI (User Interface) for accepting operations for implementing various kinds of processing, and various kinds of information such as the processing result of executed processing. The display 104 may include a touch sensor 105.

The information processing apparatus 115 may include an integrated image capturing device 110. Image data captured by the integrated image capturing device 110 undergoes predetermined image processing, and is then saved in the secondary storage device 103. Image data may be loaded from an external image capturing device 111 connected via an external I/F (interface) 108.

The information processing apparatus 115 includes an external I/F (interface) 109, and can perform communication via a network 113 such as the Internet. The information processing apparatus 115 can obtain, via the communication I/F 109, image data from servers 114 connected to the network 113.

The information processing apparatus 115 includes an acceleration sensor 106, and can obtain acceleration information about the position and attitude of the information processing apparatus 115 itself. The information processing apparatus 115 is connected to a printer 112 via an external I/F 107, and can output data such as image data. The printer 112 is also connected to the network 113, and can transmit/receive image data via the communication I/F 109.

Each of the external I/Fs 107 to 109 is an interface having at least one of a wired communication mode and wireless communication mode, and communicates with an external device (the printer 112 or server 114) in accordance with the communication mode used. For wired communication, for example, USB, Ethernet®, or the like is used. For wireless communication, a wireless LAN, NFC, Bluetooth®, infrared communication, or the like is used. If a wireless LAN is used for wireless communication, there are a mode in which apparatuses are directly connected to each other and a mode in which apparatuses are connected to each other via a relay unit such as a wireless LAN router. Although the external I/Fs 107 to 109 are illustrated separately in this figure, they may be integrally arranged.

A battery 117 supplies power necessary for the operation of the information processing apparatus 115. The various components of the information processing apparatus 115 are interconnected via a control bus/data bus 116, and the CPU 100 controls the various components via the control bus/data bus 116.

Note that in this embodiment, the information processing apparatus 115 serves as the execution location (software execution environment) of software such as a program executed by the control unit (CPU 100) of the information processing apparatus 115.

<Block Diagram of Software>

Figure 2:
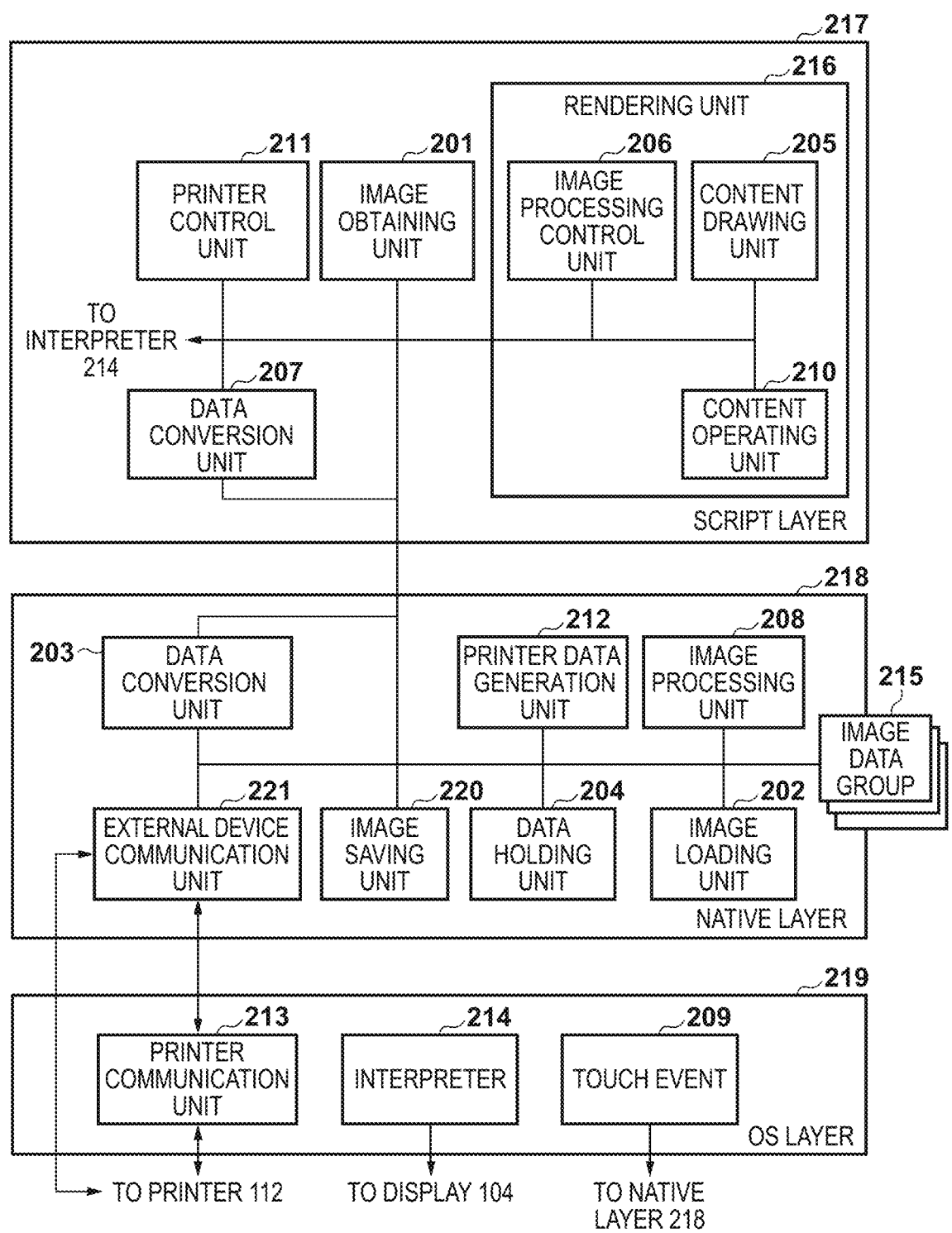
FIG. 2 is a block diagram showing the software arrangement of the information processing apparatus shown in FIG. 1.

FIG. 2 is a block diagram showing the arrangement of software programs operating on the information processing apparatus 115.

The information processing apparatus 115 executes a program of a script layer 217, native layer 218, and OS layer 219. Each layer is implemented when the CPU 100 reads out and executes the corresponding program stored in the ROM 101 or secondary storage device 103.

The script layer 217 is a program layer in which an instruction set (drawing of content, display of an image, replay of a moving image, and the like) is described by text data using a Web standard language such as HTML5, CSS3, or JavaScript®. In the script layer 217, in an application execution environment, various instruction sets of text data are interpreted and executed using a processor (for example, the CPU 100) existing in the application execution environment. In the execution form, for example, there may be a case where instruction sentences are dynamically interpreted line by line every execution operation, a case where instruction sentences are interpreted when activating an application, and a case where instruction sentences are interpreted when installing an application in the information processing apparatus 115.

Processing in the script layer 217 and its contents will be referred to as "script" hereinafter. As an example of a form in which the instructions of the script are interpreted in the information processing apparatus 115, the interpreter function included in the native layer 218 or OS layer 219 is used. Note that in this embodiment, a large portion of the UI of the application is assumed to be described in the script layer 217.

The native layer 218 is a program layer in which an instruction set interpreted (compiled) in advance in an environment other than the application execution environment is described. In the native layer 218, a code described in a high-level language such as C or C++ is compiled in advance on the server or the PC of the developer of the application into an ensemble of instructions interpretable by the CPU 100. Processing in the native layer 218 and its contents, and invocation of the function of the OS layer 219 (to be described later) from the native layer 218 will be referred to as "native" hereinafter. Note that an example of another implementation of the native layer 218 is Java. Java is a high-level language similar to C/C++, and is interpreted in advance into an intermediate code in the development environment at the time of development of the application. The interpreted intermediate code operates in the Java virtual environment of each OS. In this embodiment, such program form is also regarded as a kind of native layer 218.

The OS layer 219 corresponds to the operating system (OS) of the information processing apparatus 115. The OS layer 219 has a unique function and a role of providing the use of the hardware function to the application. The OS layer 219 includes an API. The function of the OS layer 219 can be used from the script layer 217 and native layer 218.

In this embodiment, allowing invocation of the native layer 218 from the script layer 217 will be referred to as "binding" or "bind". The native layer includes an API, and the various functions of the native layer can be used when the script invokes the API. In general, this binding function is normally included in each of various OSs.

Note that in this embodiment, the application including the script layer 217 and native layer 218 will be referred to as a hybrid application.

An image obtaining unit 201 of the script layer 217 requests the native layer 218 to obtain image data. At the time of the obtaining request, the image obtaining unit 201 generates a unique ID, and transmits it to the native layer 218. This ID and the image data loaded by an image loading unit 202 of the native layer 218 make a pair, and the pair is stored in a data holding unit 204 of the native layer 218. In addition, for example, a method of designating an absolute path, a method of prompting display of a dialog, or the like can be used, as an obtaining request method.

The image loading unit 202 of the native layer 218 obtains the image data from an image data group 215. A method of obtaining the image data from the image data group 215 depends on the request of the image obtaining unit 201 of the script layer 217. The request method may be selected from a dialog box provided on the UI, or an image may be directly selected based on the path of a file.

A data conversion unit 203 of the native layer 218 converts data in the native layer 218 (for example, image data of a binary format) into data in a format usable in the script layer 217 (for example, image data of a text format (base64)). On the other hand, the data conversion unit 203 also converts data sent from the script layer 217 (for example, image data of a text format (base64)) into data in a format usable in the native layer 218 (for example, image data of a binary format)).

A data conversion unit 207 of the script layer 217 converts data in the script layer 217 (for example, a processing parameter of a text format) into data in a format usable in the native layer 218 (for example, a processing parameter of a text format (JSON format)).

The data holding unit 204 of the native layer 218 holds the image data loaded by the image loading unit 202 and image data having undergone image processing by an image processing unit 208. The held image data is rasterized into, for example, an RGB image data, and has a format in which it is possible to immediately execute image processing. Also, the held image data and an ID generated by the image obtaining unit 201 make a pair. Thus, upon obtaining image data from the data holding unit 204, the ID may simply be designated.

A content drawing unit 205 of the script layer 217 describes a content to be printed by using a Web standard language. The script operated by a content operating unit 210 is also reflected on the description. The script of the content described by the content drawing unit 205 is interpreted by an interpreter 214 of the OS layer 219, and displayed on the display 104.

An image processing control unit 206 of the script layer 217 determines a correction parameter to be used for image processing and an image to be processed and requests the image processing unit 208 to perform the image processing. The correction parameter is converted by the data conversion unit 207 into a format transmissible to the native layer and transmitted to the native layer together with the ID of the image to be processed.

The image processing unit 208 of the native layer performs image processing for the image designated by the image processing control unit 206. At this time, what kind of image processing is to be applied is determined by the correction parameter set by the image processing control unit 206. As a method of designating an image, for example, the path of the image is received from the script layer, or whole image data is received.

A touch event 209 of the OS layer 219 obtains information about a touch of the display 104. The information about a touch includes, for example, touch detection of the display 104 and touched position information. The obtained information about a touch is transmitted to the content operating unit 210 of the script layer 217 via the native layer 218.

The content operating unit 210 of the script layer 217 operates the image, for example, enlarges, moves, and rotates the image and changes the script instruction to reflect the operation.

A printer control unit 211 of the script layer 217 controls a rendering start request to a rendering unit 216, a printer detection request, display of a printer setting screen, and generation and transmission of print information. In the printer setting screen, printer settings such as a paper size, paper type, and color/monochrome are made. A printer data generation unit 212 generates printer data based on the items set in the printer setting screen.

Based on the request from the printer control unit 211, the printer data generation unit 212 of the native layer 218 generates a command and data necessary for printer communication. The data necessary for printer communication is data complying with a communication protocol, and the command is data for determining the operation of the printer such as printing or scanning. Hence, the printer data generation unit 212 generates printer data including a command for determining the operation of the printer.

An external device communication unit 221 of the native layer 218 is an interface (IF) configured to communicate with an external device such as a printer connected to the information processing apparatus 115. The external device communication unit 221 transmits data received from the printer data generation unit 212 or receives information from the printer 112. In this embodiment, communication is done via a printer communication unit 213 of the OS layer 219. However, the external device communication unit 221 may directly transmit data to the external I/F 107. If the printer communication unit 213 of the OS layer 219 is compatible with the communication protocol used by the external device, the function is used. If the printer communication unit 213 is not compatible with the communication protocol used by the external device, the external device communication unit 221 performs communication in accordance with the communication protocol.

An interpreter 214 of the OS layer 219 interprets/executes an instruction generated in the script layer 217 and described in the Web standard language. For example, an instruction of drawing an image or the like is executed via the interpreter 214 and displayed on the display 104.

The image data group 215 is an area which holds image data. A data saving unit 220 functions to save image data held in the data holding unit 204 in the image data group 215, as needed.

The rendering unit 216 controls the content drawing unit 205, image processing control unit 206, and content operating unit 210 to render the image data to be processed. This rendering operation includes, for example, causing the script layer 217 to generate an image having an output resolution to the printer 112. At this time, neither the rendering result in the script layer 217 nor the image currently generated is displayed on the display 104. The rendering result is transmitted to the data conversion unit 203 of the native layer 218, and converted into image data in a format usable by the printer 112.

<Processing Associated with User Operation>

Figure 3:
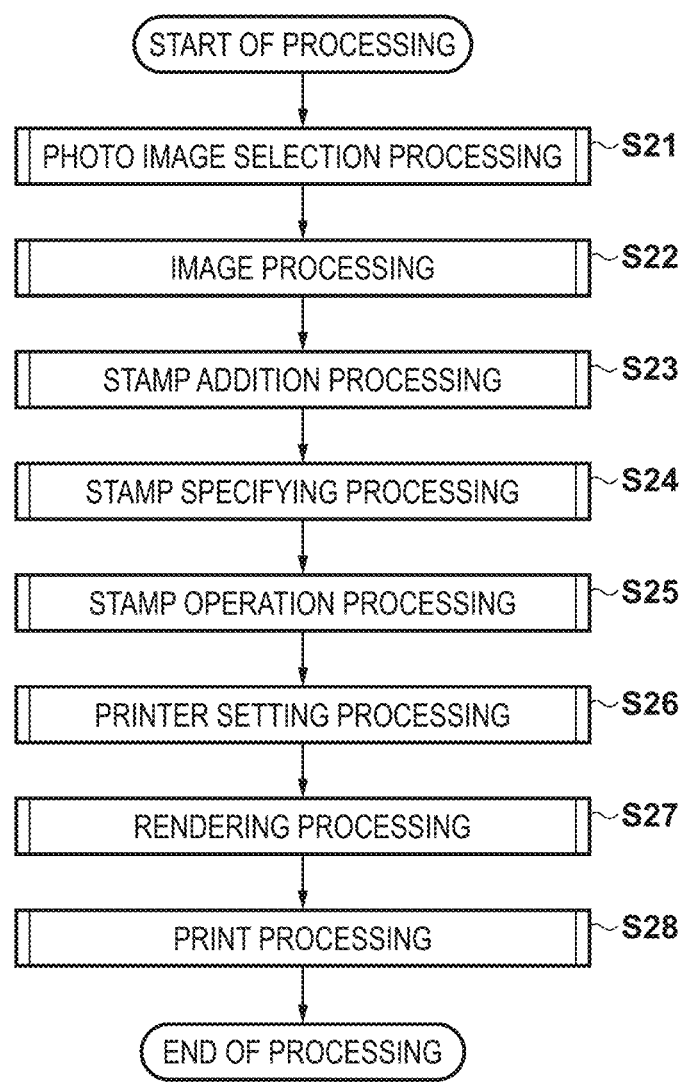
FIG. 3 is a flowchart illustrating processing associated with a user operation.

FIG. 3 is a flowchart illustrating processing including a user operation. An overview of each of processes in steps S21 to S28 will be explained with reference to FIG. 3 and details thereof will be described later. Note that the process of each step shown in the flowchart of the present application is implemented when the CPU 100 of the information processing apparatus 115 executes a program stored in the ROM 101 or secondary storage device 103. Each step shown in FIG. 3 moves according to a user operation on an application screen 1200 as a UI shown in FIG. 12. This application screen 1200 is generated by the script layer 217. An operation on the application screen 1200 is implemented via, for example, the touch sensor 105.

In step S21, upon detecting a user operation (including a touch operation input, the same shall apply hereinafter) on a photo image selection button 1201 of the application screen 1200, the CPU 100 selects a desired image in accordance with the operation. After the image is selected, the CPU 100 displays the selected image on an entire drawing area 1206 of the application screen 1200.

In step S22, upon detecting a user operation on a slide bar 1202 for adjusting the brightness of the displayed image, the CPU 100 sets a correction parameter to be used for image processing in accordance with the user operation. The CPU 100 performs the image processing for the displayed image according to the set correction parameter, and displays processing contents and a processing result in the drawing area 1206.

In step S23, upon detecting a user operation on a stamp addition button 1203, the CPU 100 displays a stamp list. Upon detecting selection of a stamp by a user operation on the stamp list, the CPU 100 adds/displays the selected stamp in the drawing area 1206.

In step S24, the CPU 100 specifies a stamp in accordance with a user operation on the application screen 1200. The stamp specifying operation is performed to determine whether the stamp has been touched, based on coordinates touched by the user operation on the display 104 and the coordinates of the stamp. If the stamp has been touched, the stamp is set in an operation acceptance status. In this example, the stamp is set in the operation acceptance status in response to the user operation. The operation acceptance status will be described later.

In step S25, upon detecting a user operation in which a user swipes the stamp in the operation acceptance status, the CPU 100 moves the stamp in the operation acceptance status in the drawing area in accordance with the user operation.

In step S26, upon detecting a user operation on a print button 1205, the CPU 100 displays a setting screen 1301 (FIG. 13) for setting information necessary for printing. The information necessary for printing includes, for example, a paper size, paper type, print quality, bordered/borderless setting item, as shown in the setting screen 1301 of FIG. 13. In addition, settable setting items such as double-sided/single-sided and monochrome/color are provided depending on the functions of the printer to be used.

In step S27, upon detecting a user operation on a setting completion button 1302 of the setting screen 1301, the CPU 100 executes rendering to convert the image displayed in the drawing area 1206 into a print resolution for output to the printer.

In step S28, the CPU 100 transmits the image converted into the print resolution to the printer 112 together with a printer control command. With the above-described process, the image selected by the user is printed by the printer 112.

Note that the processing shown in FIG. 3 is merely an example. Processing contents are not limited to them, and the processing order of the steps is not limited to this. In this embodiment, the first program layer including an instruction set to be interpreted and executed by the processor is defined as the script layer 217, and the second program layer including an instruction set compiled in advance by a unit other than the processor is defined as the native layer 218. A program including the first program layer and the second program layer implements a hybrid application. Character string data is defined as the first format and binary data is defined as the second format. Note that the script layer 217 is able to hold data of a text format, and the native layer 218 is able to hold data of a binary format.

<Details of Photo Image Selection Processing and its Image Processing>

Several embodiments directed to a photo image selection processing executed by the information processing apparatus having the above-described arrangement and image processing associated with it will be described next. Hence, in this case, the information processing apparatus 115 functions as an image processing apparatus.

First Embodiment

Figure 12:
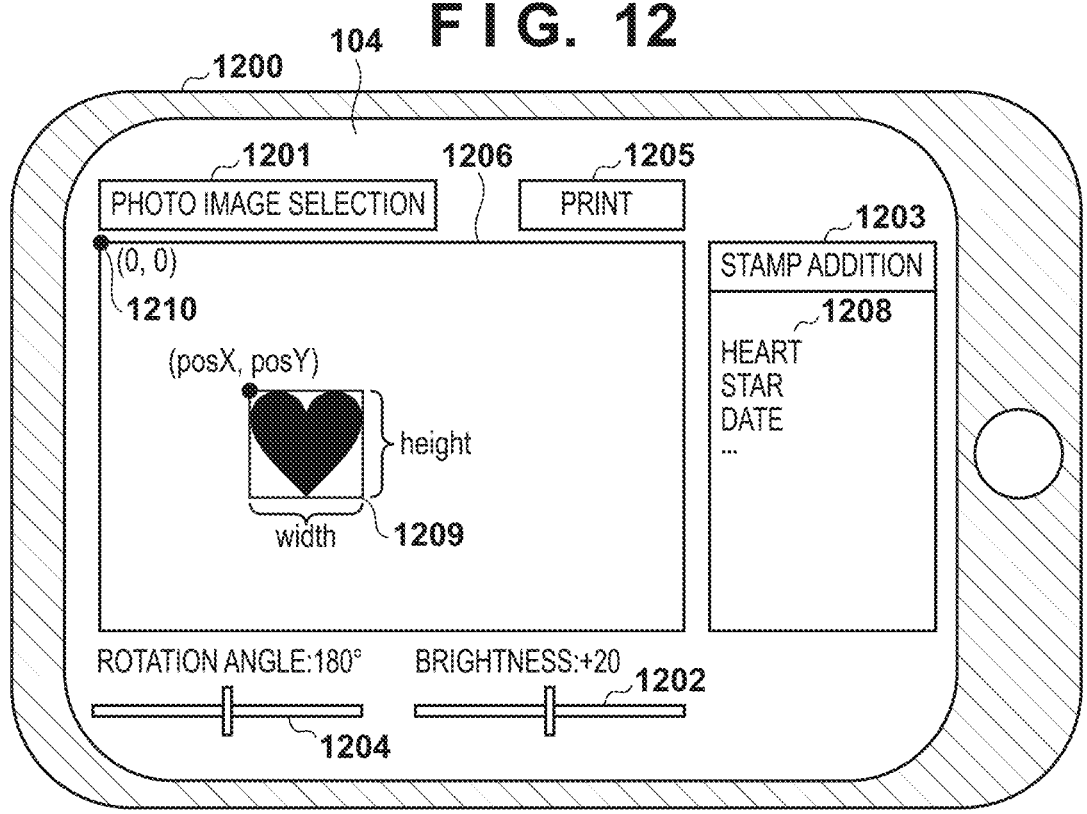
FIG. 12 is a view showing an example of an application screen.

When the user presses a photo image selection button 1201 shown in FIG. 12, step S21 starts. Details of the photo image selection processing in step S21 of FIG. 3 will be described with reference to FIG. 4. Note that steps S301, S302, and S309 to S311 are processes executed by the CPU 100 using the program of the script layer 217, and steps S303 to S308 are processes executed by the CPU 100 using the program of the native layer 218.

In step S301, the CPU 100 generates a unique ID. This ID may have any form such as a numerical value or character string as long as it can be transmitted from the script layer 217 to the native layer 218. In step S302, the CPU 100 requests the native layer 218 to select an image in accordance with a user operation on the photo image selection button 1201. In step S302, the ID generated in step S301 is also transmitted to the native layer 218. As a request method, the binding function is used to directly invoke an image selection API unique to the native layer 218 from the script layer 217. However, if the image selection API unique to the native layer cannot directly be invoked, a function capable of being directly invoked from the script layer 217 is prepared in the native layer 218, and a function for invoking the image selection API unique to the native layer is described in the function. This is a method of preparing a wrapper in advance. The API has a mechanism for transferring the ID as, for example, an argument. The ID is thus transferred to the native layer 218.

In step S303, the CPU 100 displays a device-specific image selection UI on the display 104. Based on a user operation on the displayed image selection UI, the CPU 100 selects one desired image. Note that in this embodiment, one image is selected from an image folder in the device. However, the present invention is not limited to this. For example, an image on the Internet or an image in a detachable storage medium may be selected, or an image may be shot using the camera function of the device on the spot and selected.

In step S304, the CPU 100 obtains the selected image. For example, if the selected image has a form of an image file, the CPU 100 opens the file and reads the contents.

In step S305, the CPU 100 rasterizes the obtained image in an RGB space. In this example, RGB data is held in the native layer 218. However, the present invention is not limited to this. For example, the data can also be held in JPEG (Joint Photography Expert Group), PNG (Portable Network Graphics), RGBA, or the like. The RGBA format combines the RGB (red, green, and blue) components of image data with a transparency A.

In step S306, the CPU 100 holds the rasterized RGB image in the data holding unit 204 in association with the ID obtained from the script layer 217. As an association method, for example, an object having the ID and RGB image is created to make it possible to specify the RGB image by the ID. An association method is not limited to this, and a path as the access destination of the ID and the selected image, a function or class to be executed in accordance with the ID and RGB rasterization, and the like can be used.

In step S307, the CPU 100 converts the rasterized RGB image into image data in a format usable (format supportable) in the script layer 217. In this embodiment, the converted data format is JPEG (Joint Photography Expert Group). Conversion from RGB image data to JPEG data is performed using an encoder provided in the OS layer 219.

Note that if the image is too large with respect to the display size of the display 104, the image is reduced and then converted into JPEG. The script performs reduction processing of the image in accordance with the size of the UI and the resolution of the display. If the script treats an image including an excessive number of pixels relative to the UI, the processing load on the CPU becomes heavy, and a large-capacity memory is needed, resulting in a waste. Hence, in this embodiment, to avoid the waste, reduction processing is executed. As a guideline of reduction processing, for example, the display size of the display or the size of a portion of the UI where an image is to be displayed is set as the upper limit, and control is performed to do reduction processing for an image whose number of pixels exceeds the upper limit. In some cases, image processing may be performed for the image in a way to be described later. In this case as well, image processing is performed for the original image (image data rasterized into RGB image), and after the reduction processing is executed, the reduced image is transferred to the script layer.

In step S308, the CPU 100 converts the data in the JPEG format into base64 data, and transmits the base64 data to the script layer 217. This is done because the data array of the RGB image cannot be used intact in the script layer 217, and it is thus necessary to convert, in the native layer 218, the data array into a format usable in the script layer 217. Since only a character string can be treated in JavaScript®, the base64 format which represents data as a character string is used in this embodiment.

Base64 is an encoding method to treat binary data as character string data. The script layer 217 can obtain image data and change it, like the native layer 218. In the script layer 217, however, data is not always held in a continuous area, unlike the native layer 218 that holds the values of, for example, an RGB array in a continuous area of the RAM 102 (memory). Since the data holding method of the script layer 217 and that of the native layer 218 are different, conventionally, image data cannot be transmitted from the script layer 217 to the native layer 218 at once as continuous data.

However, since character string data is treated as continuous data in the script layer 217 as well, the CPU 100 transmits the continuous data from the script layer 217 to the native layer 218 using the base64 format. In this embodiment, the native layer 218 performs image information conversion processing. That is, character string information received from the script layer 217 is converted into image data, thereby enabling a data operation in the native layer 218. Conversely, upon transmitting image data from the native layer 218 to the script layer 217, the image data treated in the native layer 218 is converted into character string information using the base64 method. This makes it possible to transfer image data between the script layer 217 and the native layer 218.

In step S309, the CPU 100 receives the base64 data converted in the native layer 218, and reserves a drawing area for displaying the base64 data in the RAM 102. In this embodiment, as an example of reserving the drawing area, the HTML canvas function is used, and the API of the Context object of a canvas is used to draw an image.

In step S310, the CPU 100 generates and initializes a correction parameter. The correction parameter is an object holding parameters for determining contents of the image processing in step S22. The correction parameter is used for determining what kind of image processing is to be performed in the native layer. An example of the correction parameter held by JavaScript® is:

```
var CorrectionParam = function( ){
    this.brightness = 10;
}
```

This correction parameter represents that a variable "brightness" is provided for brightness correction in a CorrectionParam object and a value of "10" is stored.

In this embodiment, for the sake of simplicity, the correction parameter only for brightness correction is used. However, parameters (the intensity of a blur filter, ON/OFF of a sepia conversion, and the like) for other correction processes may be added, as a matter of course.

In step S311, the CPU 100 designates base64 data as data to be drawn in the drawing area, thereby drawing an image in the drawing area according to the designation. More specifically, the CPU 100 transmits the base64 data designated in the script layer 217 to the interpreter 214 of the OS layer. The interpreter 214 interprets the script of the base64 data, and displays it as an image in the drawing area. An example of a sample code of reflecting the base64 data on the drawing area is:

```
var base64Data = base64 data from native layer
var canvas = document.createElement("canvas");
//reserve the drawing area of an image
canvas.setAttribute("width", 100);       //set the
                                          size of the drawing area
canvas.setAttribute("height", 100);
var context = canvas.getContext("2d");   //generate an
object having an API to be drawn in the drawing area
var img = new Image( );                  //generate an Image object
img.src = base64Data;                    //set the received base64
data as the URI of the image
img.onload = function( ){                //start processing after the
end of loading of the image
context.drawImage(img, 0, 0, img.width, img.height, 0,
0, canvas.width, canvas.height);        //draw the image in
the drawing area using a method of a context object
document.getElementById("div").appendChild(canvas);
//This flowchart assumes a layer structure of many
canvases}
```

These canvases do not freely exist everywhere, and drawing, moving, and enlargement operations are performed within a specific area (the drawing area 1206 of FIG. 12). The area is designated by "div", and each canvas is added to "div".

In this embodiment, a layer structure in which a Canvas is added to the drawing area 1206 is used. The Canvas is treated as one image. Hence, when a photo image is drawn in Canvas, and a stamp or the like is added after that, the stamp is included in the one image. In this case, it is difficult to perform specifying/operation only for the stamp in the image. On the other hand, if Canvases are overlaid and displayed using a layer structure, the actual drawing products, which are recognized as one picture by the user, are independent from each other. Hence, operations can individually be instructed for the drawing products. Note that the stamp is added to image data and is therefore called an additional image in some cases.

The image and the stamp are thus displayed on the UI as one picture (image). In this embodiment, this image is print content. The image at this point of time is displayed on the UI to do an operation or confirmation. To print, the image needs to be converted into a resolution suitable for printing, as will be described later.

<Details of Image Processing>

When the user changes the slide bar 1202 shown in FIG. 12, step S22 starts. Details of the image processing in step S22 of FIG. 3 will be described with reference to FIG. 5. Note that steps S401 to S403, S409, and S411 are processes executed by the CPU 100 using the program of the script layer 217, and steps S404 to S408, and S410 are processes executed by the CPU 100 using the program of the native layer 218.

In step S401, the CPU 100 sets the correction parameter. In this example, the CPU 100 updates the value of "brightness" of the correction parameter generated in step S310 of FIG. 3 by a value set in accordance with a user operation on the slide bar 1202. In step S402, the CPU 100 activates an indicator, and displays it on the display 104. The indicator is displayed to notify the user that the processing is in progress, and is generally represented by a progress bar, a clock mark, or an image such as blink or rotation of a figure. In step S403, in the script layer 217, the CPU 100 converts the correction parameter set in step S401 into a JSON character string format usable in the native layer 218. In this example, the correction parameter is in the form of an object, and cannot be used intact in the native layer 218. Thus, the CPU 100 converts the set correction parameter into a JSON character string. The CPU 100 transfers the correction parameter converted into the JSON character string to the native layer 218 together with the ID generated in step S301 of FIG. 4.

In step S404, the CPU 100 decodes the correction parameter converted into the JSON character string, thereby obtaining the correction parameter. More specifically, the correction parameter is parsed (analyzed) using a parser included in the OS layer 219. In the above example, after the parsing processing, "brightness" of the correction parameter is obtained.

In step S405, the CPU 100 specifies the RGB image rasterized in step S305 of FIG. 3 based on the ID obtained from the script layer 217. Note that association between the ID and the image is not limited to paring the ID and the RGB image, as described above. For example, a method of associating the path of the image with the ID may be used. There are various examples to be associated with the ID, such as an object of the native layer 218, the first address of image data, and a function of invoking the image.

In step S406, the CPU 100 determines image processing to be performed based on the obtained correction parameter, and performs the image processing for the RGB image. In this embodiment, a value of "10" is added to the R, G, and B values of all pixels according to the brightness correction parameter. Note that another piece of information may be added to the correction parameter to increase the types of image processing, as described above. For example, known monochrome conversion, known sepia conversion, "ImageFix", "RedeyeFix", "SmartSkin", and the like may be added.

"ImageFix" indicates a function (face detection function) of automatically analyzing a photo image using a human face detection or scene analysis unit, and performing appropriate brightness/white balance adjustment (see Japanese Patent Laid-Open No. 2010-278708). "RedeyeFix" indicates a function (red eye detection function) of automatically detecting a red eye image from images and correcting it (see Japanese Patent Laid-Open No. 2006-350557). "SmartSkin" indicates a function of detecting a human face from a photo image, and suitably processing the skin region of the face (see Japanese Patent Laid-Open No. 2010-010938). Note that the types of image processing functions are not limited to these, and various kinds of image processing can be used in accordance with the application and purpose. Additionally, image processing may be performed using a function provided by the OS layer 219. In this case as well, the processing arrangement is the same as in this embodiment.

In step S407, the CPU 100 converts the RGB image having undergone the image processing into image data in a format usable (format supportable) in the script layer 217. In this example, the CPU 100 converts the RGB image into data in the JPEG format, similarly to step S307 of FIG. 4. Note that if the image size is large as compared to the UI, as described above, reduction processing is executed before conversion to JPEG data. In step S408, the CPU 100 requests the script layer 217 to stop the indicator. This is implemented by invoking an indicator stop function defined in the script layer 217 from the native layer 218.

In step S409, the CPU 100 stops the indicator, and removes the indicator displayed on the display 104.

On the other hand, in step S410, the CPU 100 converts the converted data in the JPEG format into base64 data, and transmits the base64 data to the script layer 217.

Figure 4:
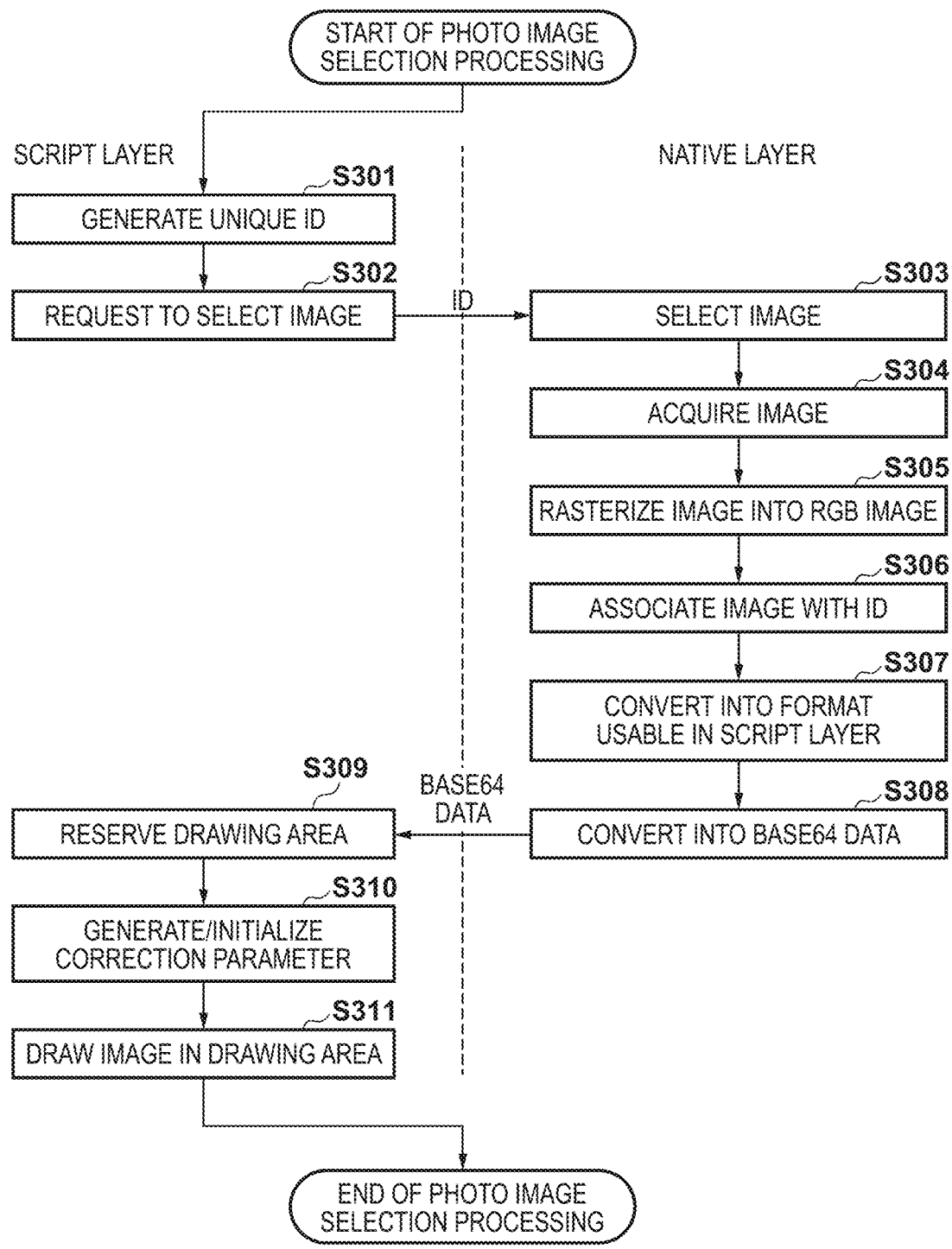
FIG. 4 is a flowchart illustrating details of photo image selection processing according to a first embodiment.

In step S411, the CPU 100 receives the base64 data converted in the native layer 218, and draws an image in the drawing area reserved in step S309 of FIG. 4 in accordance with the base64 data. More specifically, the CPU 100 transmits the base64 data designated in the script layer to the interpreter 214 of the OS layer. The interpreter 214 interprets the script of the base64 data and displays the drawing result of the image data in the designated drawing area of the UI. With the above-described process, the image to which the image processing based on the correction parameter has been applied is displayed.

In this embodiment, image processing is started by a change of the slide bar 1202 as shown in FIG. 12. However, the starting method is not limited to this. For example, a plus button and a minus button may be provided in the screen, and the brightness may be adjusted every time the user presses the buttons. The image processing may be implemented by processing synchronized with a touch event. For example, the brightness is increased by touching the right half of the screen and decreased by touching the left half. Alternatively, a method may be employed which changes only the correction parameter by a user operation, and performs all image processes at once upon receiving an image processing execution instruction.

<Details of Stamp Addition Processing>

Figure 6:
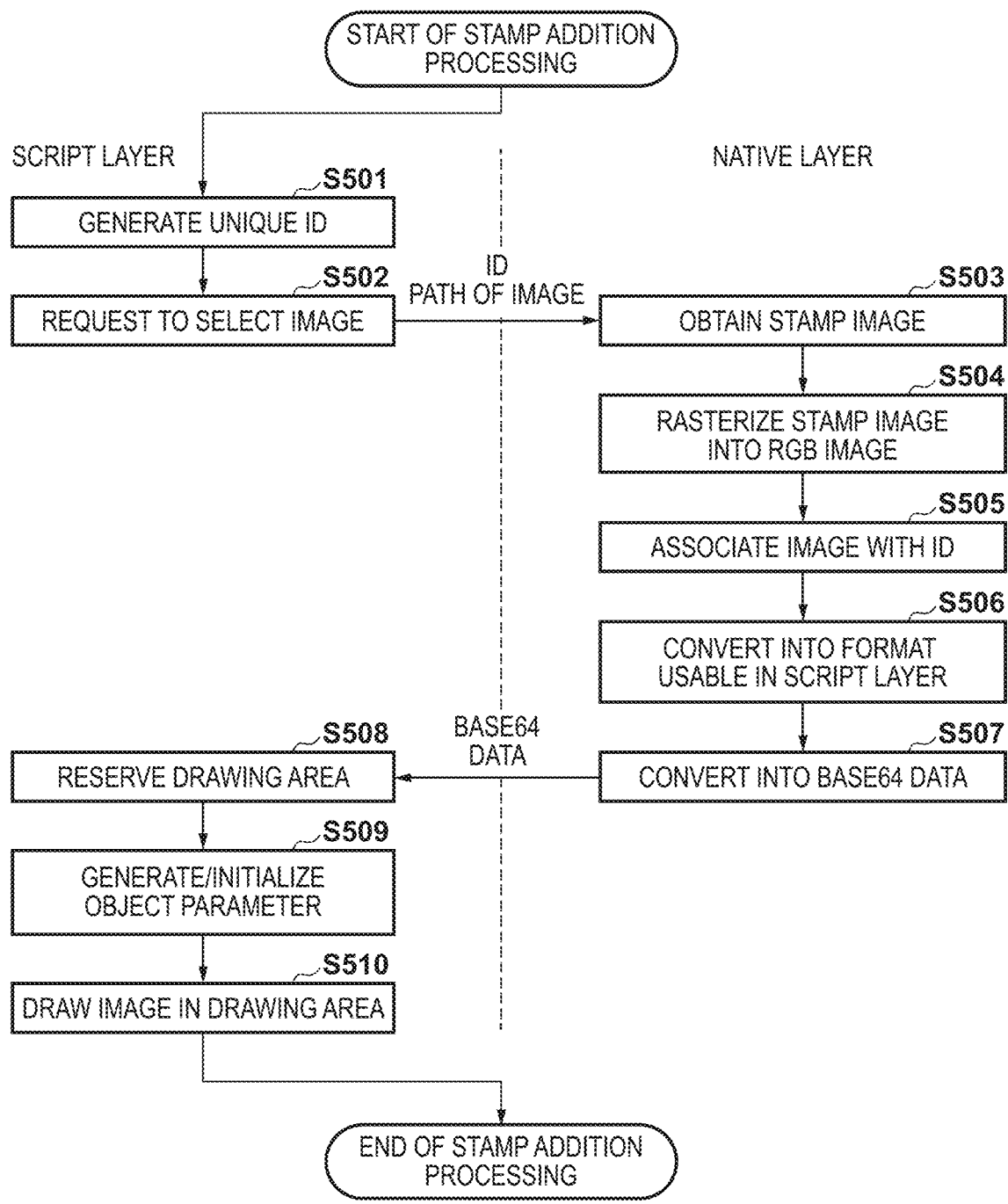
FIG. 6 is a flowchart illustrating details of stamp addition processing according to the first embodiment.

When the user presses the stamp addition button 1203 shown in FIG. 12, and selects a heart stamp 1208, the process of step S23 starts. Details of the stamp addition processing in step S23 of FIG. 3 will be described with reference to FIG. 6. In the following description, a case in which the heart stamp 1208 is selected after the stamp addition button 1203 of the application screen 1200 shown in FIG. 12 is pressed by a user operation and the stamp list is displayed will be exemplified. Note that steps S501, S502, and S508 to S510 are processes executed by the CPU 100 using the program of the script layer 217, and steps S503 to S507 are processes executed by the CPU 100 using the program of the native layer 218.

In step S501, the CPU 100 generates a unique ID. This ID has the same characteristic as that of the ID generated in step S301 of FIG. 3. Thus, the ID is generated according to the method described in the step S301. In step S502, the CPU 100 transmits the access destination (absolute path) of an image to be used as a stamp to the native layer 218 together with the ID generated in step S501, thereby requesting to select the stamp image corresponding to the stamp.

In step S503, the CPU 100 obtains the stamp image using the absolute path of the stamp image received from the script layer 217 and a device-specific image selection API. In step S504, the CPU 100 rasterizes the obtained stamp image into an RGB image. In step S505, the CPU 100 holds the rasterized RGB image in the data holding unit 204 in association with the ID obtained from the script layer 217. An association method is the same as that in step S306 of FIG. 4. In step S506, the CPU 100 converts the RGB image rasterized in the native layer 218 into image data in a format usable (format supportable) in the script layer 217. In this conversion processing, the CPU 100 converts the RGB image into data in the JPEG format, similarly to step S307 of FIG. 4. In step S507, the CPU 100 converts the data in the JPEG format into base64 data, and transmits the base64 data to the script layer 217.

In step S508, the CPU 100 receives the base64 data converted in the native layer 218, and reserves a drawing area for displaying the base64 data in the RAM 102. In step S509, the CPU 100 generates and initializes an object parameter. Note that the object parameter is an object for holding parameters to be used, at the time of the rendering processing (to be described later in detail) in step S27 of FIG. 3, to determine the rotation angle of the stamp after the rendering processing. An example of the object parameter held by JavaScript® is:

```
var ObjectParam = function( ){
    this.theta = 0;
    this.posX = 0;
    this.posY = 0;
    this.width = 100;
    this.height = 100;
}
```

This object parameter represents that a variable name "theta" indicating the rotation angle is provided in an ObjectParam object and a value of "0" is stored in "theta". Similarly, "posX" represents an x-coordinate when the upper left corner of the drawing area (1206 in FIG. 12) is set as a reference point (1210 in FIG. 12), and "posY" represents a y-coordinate when the upper left corner of the drawing area is set as a reference point. Also, "width" represents the lateral width (1209 in FIG. 12) of the drawing area, and "height" represents the longitudinal width of the drawing area. Note that the object parameter is minimized in this embodiment for the sake of simplicity. However, it is apparent that other parameters (translation amount, enlargement magnification, and the like) can be added and used at the time of drawing or rendering.

In step S510, the CPU 100 displays the base64 data as an image in the drawing area 1206 based on the generated object parameter. More specifically, the CPU 100 transmits the base64 data corresponding to the selected stamp to the interpreter 214 of the OS layer. The interpreter 214 interprets the script of the base64 data and displays it in the drawing area as a stamp image.

Note that one stamp is selected in this embodiment for the sake of simplicity. However, a plurality of stamps can be selected, as a matter of course. In addition, an image prepared in advance is used as a stamp in this embodiment. However, a method of generating, in the script layer, a drawing product by using a Context object may be used.

<Details of Stamp Specifying Processing>

Figure 7:
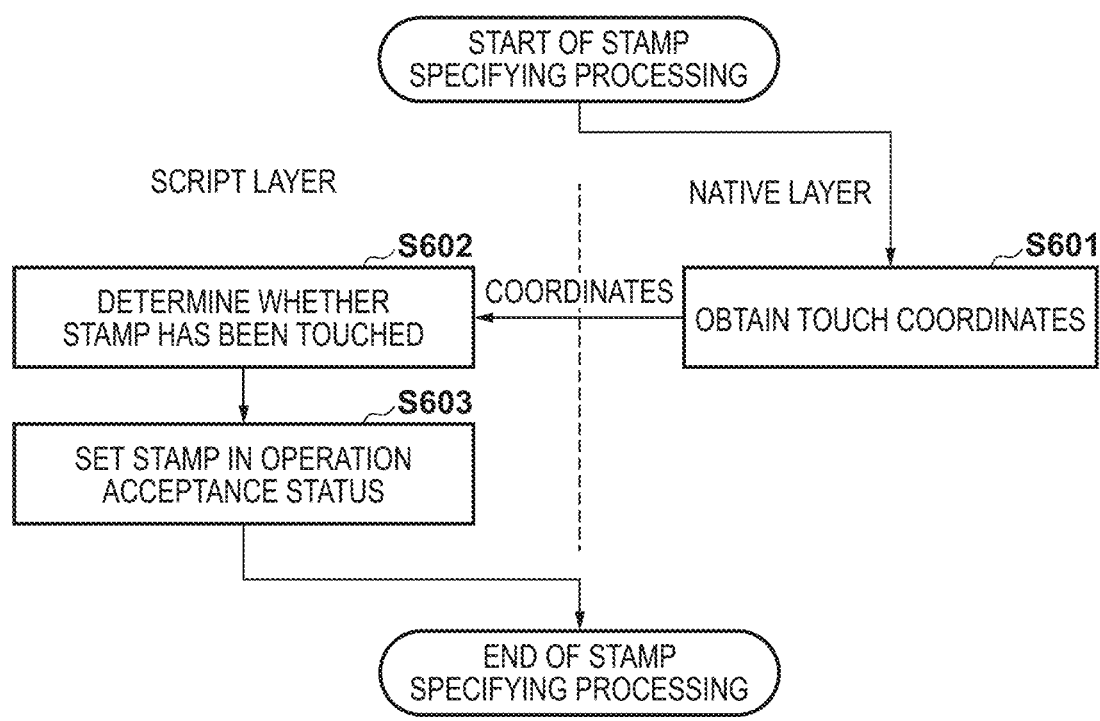
FIG. 7 is a flowchart illustrating details of stamp specifying processing.

When the user taps the display 104 shown in FIG. 1, step S24 starts. "Tap" is an operation of pressing the screen of a portable information terminal by a finger. This is an operation corresponding to "click" on a PC by a pointing device. Details of the stamp specifying processing in step S24 of FIG. 3 will be described with reference to FIG. 7. Note that steps S602 and S603 are processes executed by the CPU 100 using the program of the script layer 217, and step S601 is a process executed by the CPU 100 using the program of the native layer 218.

In step S601, the CPU 100 obtains coordinates touched on the display 104, and transmits them to the script layer 217.

Figure 5:
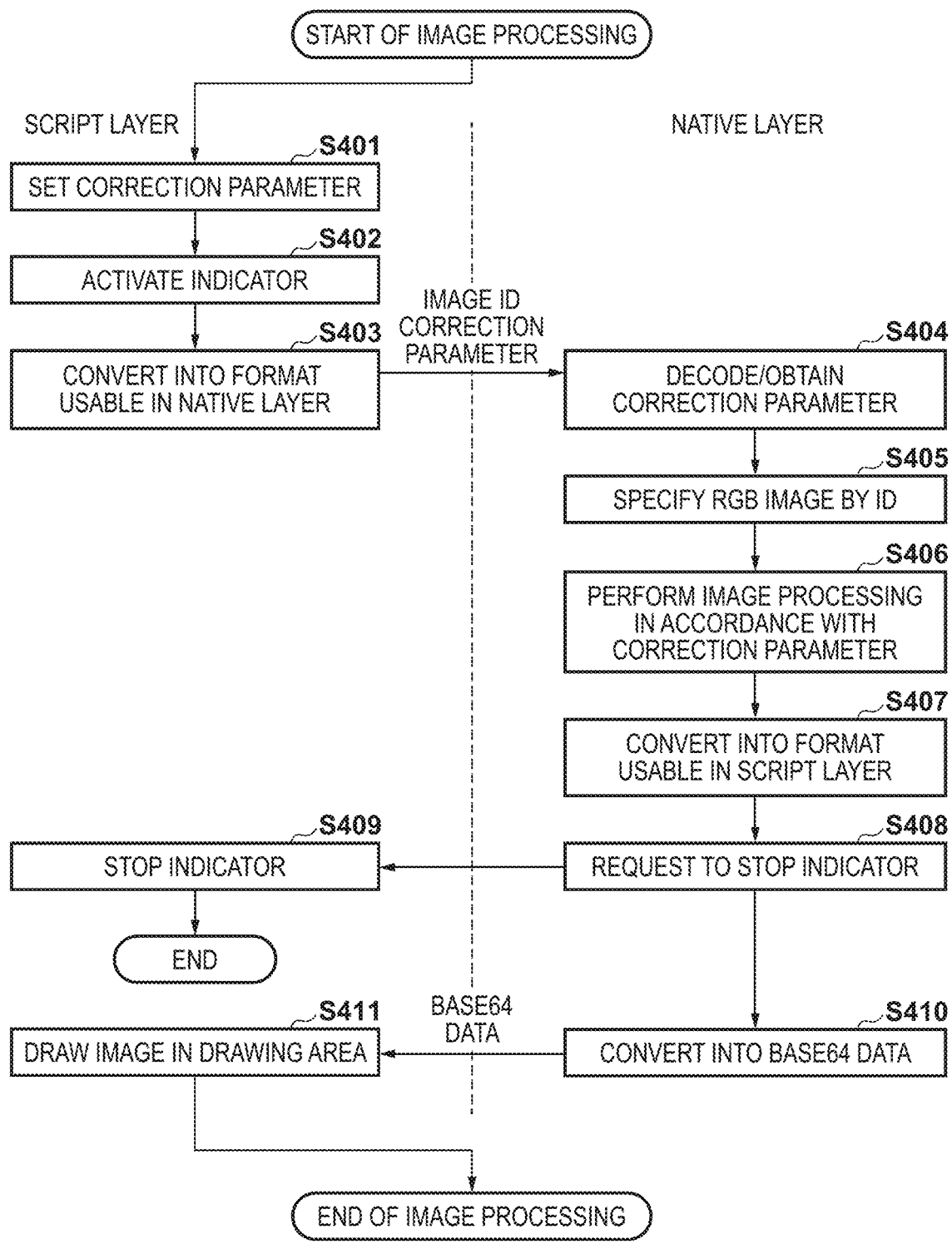
FIG. 5 is a flowchart illustrating details of image processing according to the first embodiment.

In step S602, the CPU 100 determines whether the stamp added in step S23 of FIG. 3 has been touched, based on the coordinates received from the native layer 218 and information of the object parameter generated in step S509 of FIG. 5. In the added stamp, the object parameter includes the initial values. Therefore, according to the above example of the object parameter, the stamp is drawn in an area of 100 in the x direction and 100 in the y direction with reference to the reference point 1210 (0, 0) set at the upper left corner of the drawing area 1206. If, therefore, a value obtained by subtracting the x-coordinate of the drawing area 1206 from the x-coordinate of the received coordinates (x, y) falls within the range from 0 to 100, and a value obtained by subtracting the y-coordinate of the drawing area 1206 from the y-coordinate of the received coordinates (x, y) falls within the range from 0 to 100, it can be determined that the stamp has been touched. If there exist a plurality of stamps, the determination is made sequentially from the stamp displayed on the upper layer, and the processing is ended when the stamp is specified. If it is determined that the stamp has been touched, the stamp is set in the operation acceptance status in step S25 of FIG. 3.

The following description will be provided by assuming that the stamp added in step S23 of FIG. 3 has been touched in step S24 of FIG. 3.

In step S603, the CPU 100 sets the stamp in the operation acceptance status in accordance with the determination result. Setting the stamp in the operation acceptance status is equivalent to a state in which when an instruction concerning a stamp operation is input, an operation according to the instruction is executed for the stamp. If there is no stamp in the operation acceptance status, no change occurs even if an instruction concerning a stamp operation is input. In this embodiment, only the slide bar 1204 configured to rotate a stamp has been mentioned. However, another arrangement of stamp operation may be used, as a matter of course.

<Details of Stamp Operation Processing>

Figure 8:
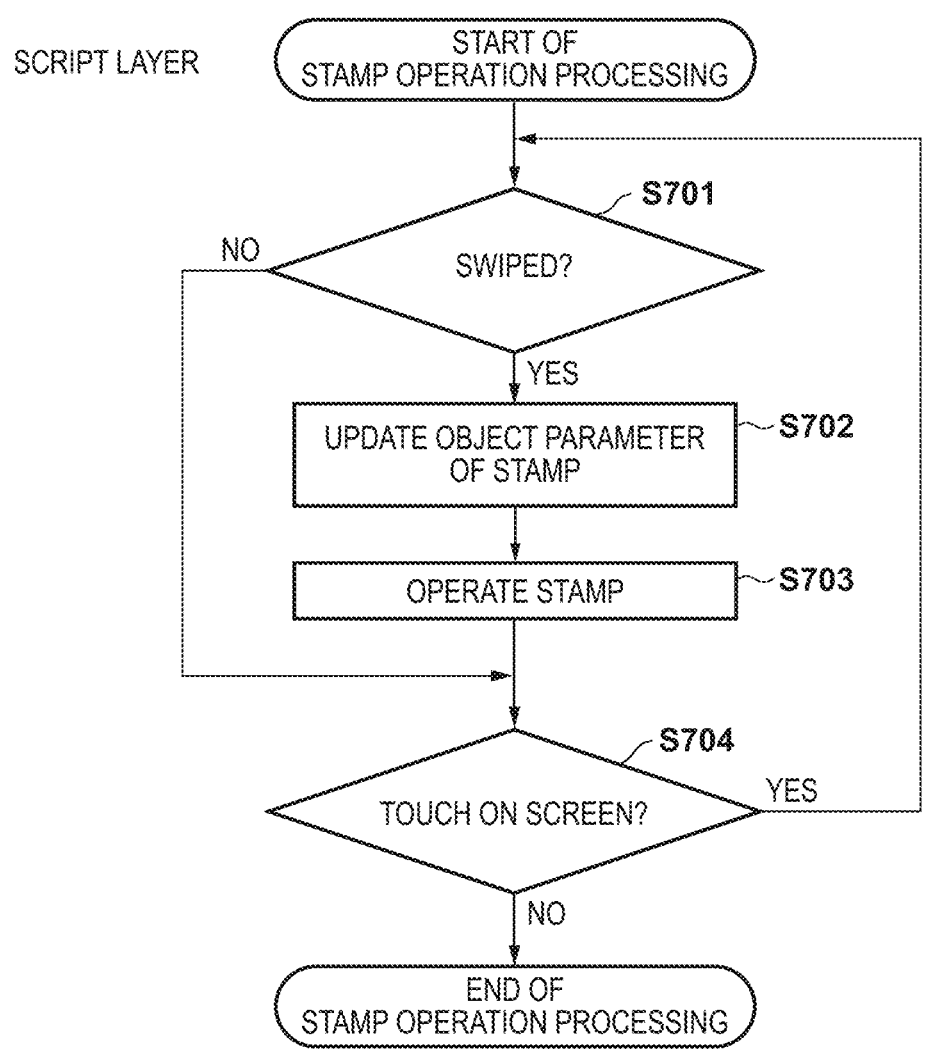
FIG. 8 is a flowchart illustrating details of stamp operation processing.

When the stamp is set in the operation acceptance status, step S25 of FIG. 3 starts. Details of the stamp operation processing in step S25 of FIG. 3 will be described with reference to FIG. 8. Note that the steps shown in FIG. 8 are processes executed by the CPU 100 using the program of the script layer 217.

In step S701, the CPU 100 checks whether the script has been "swiped", based on information that can be obtained from a touch event. In a case where it is judged that the script has been "swiped", the process advances to step S702. Otherwise, the process advances to step S704. "Swipe" is an operation of tapping on the portable information terminal and then moving the finger without releasing the screen. This corresponds to a "drag" operation on a PC using a pointing device.

In step S702, the CPU 100 updates the values posX and posY of the object parameter of the stamp to x- and y-coordinates obtained by "swipe". In step S703, the CPU 100 moves the stamp 1209 in the drawing area 1206 to the updated coordinate position (posX, posY) using the object parameter based on the updated values posX and posY.

In step S704, the CPU 100 obtains, from a touch event, whether or not the touch on the screen is maintained after the stamp operation. In a case where it is judged that the touch is canceled, the stamp operation ends, and the processing in step S25 of FIG. 3 ends. However, in a case where it is judged that the user is continuing touching, the process returns to step S701 to repeat the above-described processing.

Note that in this embodiment, only movement by a swipe event has been described as a stamp operation. However, the present invention is not limited to this. Many combinations of touch events and content operations are possible, for example, stamp enlargement by pinch out and translation of a drawing product of Canvas by combining long tap (long press) and swipe are possible.

"Pinch out" is a user operation of touching the screen by two fingers and then separating the two fingers. In a general portable information terminal, this operation is often used to, for example, enlarge an image/screen. The aforementioned movement is different from movement in the drawing area 1206 and indicates that the stamp 1209 as a drawing product moves in the Canvas. For example, in FIG. 12, if the heart in the stamp 1209 is moved rightward by width/2, a state is obtained in which nothing is displayed on the left half of the stamp 1209, and the left half of the heart is placed in the right half of the stamp 1209.

<Details of Printer Setting Processing>

When the user presses the print button 1205 shown in FIG. 12, the process of step S26 of FIG. 3 starts. Details of the printer setting processing in step S26 of FIG. 3 will be described with reference to FIG. 9. Note that steps S901 and S909 to S911 are processes executed by the CPU 100 using the program of the script layer 217, and steps S902, S904, S905, S907, S908, and S912 are processes executed by the CPU 100 using the program of the native layer 218. In addition, steps S903 and S906 are processes executed by the printer 112.

In step S901, from the script layer 217, the CPU 100 requests the native layer 218 to obtain printer information as device information. This is equivalent to a request from the script layer 217 for communicating with the printer 112. As a request method, an API unique to the native layer is invoked from the script layer by using the binding function, similarly to the image selection processing. A function capable of being directly invoked from the script layer 217 or a so-called wrapper of indirectly invoking the function is prepared in advance in the native layer 218. For example, a native function GetPrinterInfo is prepared, and invoked from the script side. In this way, the native layer obtains a request to communicate with an external device from the script layer.

Usually, it is impossible to directly communicate with an external device from the script layer 217 due to the security restrictions. Therefore, as described above, the script layer 217 first requests the native layer 218 to obtain external device information, and then communicates with an external device via the native layer 218. The native layer 218 has a function of communicating with an external device (for example, the printer 112) via the OS layer 219.

In step S902, when the native layer 218 invokes the function, the CPU 100 performs printer detection or so-called discovery. For example, a printer connected by the same wireless LAN router is detected. Since a communicable printer is detected, the CPU 100 attempts to communicate with the printer using by a method such as broadcast or multicast using a protocol such as Bonjour®.

In step S903, the printer 112 responds to the request.

In step S904, the CPU 100 detects and stores the IP address of the printer that has responded. In step S905, the CPU 100 requests the IP address of the printer that has responded to provide printer information. If a plurality of printers have responded, the CPU 100 requests all printers to provide information. To do this, the CPU 100 generates, in the native layer, a command to obtain the information of each printer. The command is an instruction to designate the operation of the printer, and its example is expressed in XML given by:

```
01: <?xml version="1.0" encoding="utf-8" ?>
02: <cmd xmlns:trans="http://www.xxxx/yyyyy/">
03:     <contents>
04:         <operation>GetInformation</operation>
05:     </contents>
06: </cmd>
```

A numerical value such as "01:" written in the left portion of each line is a line number added for the descriptive purpose, and is not described in actual text data in the XML format.

The first line indicates a header representing that the command is described in the XML format.

On the second line, "cmd" indicates the start of the command. A name space is designated by "xmlns" to designate the definition of interpretation of the command. Note that </cmd> on the sixth line indicates the end of the command.

The third line indicates a declaration of describing contents thereafter, and the fifth line indicates the end of the contents.

On the fourth line, an instruction to be requested is described. An actual instruction word exists between <operation> and </operation>. An instruction word "GetInformation" is an instruction of obtaining information of a printer as an external device. For example, it is requested to provide capability information such as a paper type, a size, the presence/absence of a marginless printing function, and the print quality supported by the printer.

Note that a printer information obtaining command may be generated by, for example, loading permanent text stored in advance in the ROM 101. Also, the format is not limited to a text format such as XML, and the command may be described in the binary format, and communicated by a protocol complying with the format. The generated printer information obtaining command is transmitted to the printer 112 via the external device communication unit 221 in a format complying with a communication protocol such as HTTP supported by the printer.

A communication method is not limited to this. Connection using Wi-Fi® Direct, Bluetooth®, infrared communication, telephone line, wired LAN, or USB may be used. By performing communication by a protocol complying with the method, it is possible to obtain the same effects.

Figure 9:
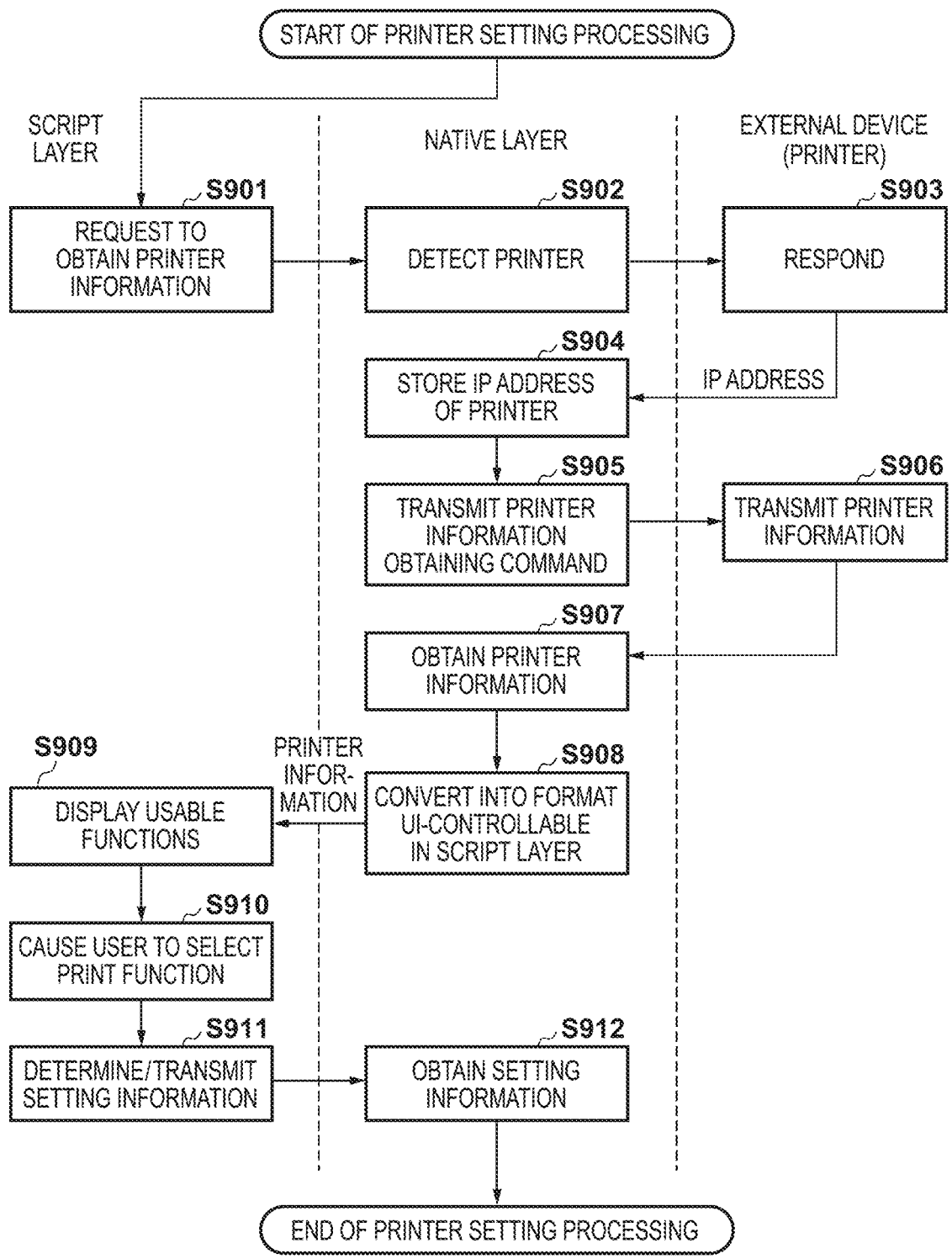
FIG. 9 is a flowchart illustrating details of printer setting processing.

Referring to FIG. 9, a command is generated in the native layer 218. However, even if a command is generated in the script layer 217, it is possible to obtain the same effects. In this case, for example, a command including the above instruction sentence in the XML format is created in the script layer 217, and transferred to the native layer 218. Upon receiving the instruction sentence, the native layer 218 transmits the command to the printer 112 in a format complying with a communication protocol.

Upon receiving the command from the information processing apparatus 115, in step S906, the printer 112 transmits the printer information as device information in the XML format to the information processing apparatus 115 according to the communication protocol. An example of the printer information is given by:

```
01: <?xml version="1.0" encoding="utf-8" ?>
02: <cmd xmlns:trans="http://www.xxxx/yyyyy/">
03:     <contents>
04:         <device id="Printer001" />
05:         <memory receive = 7680000 />
06:         <mode = 1>
07:             <media>GlossyPaper</media>
08              <size>A4</size>
09:             <quality>1</quality>
10:             <border>no</border>
11:             <dpi x=1200 y=1200 />
12:         </mode>
13:         <mode = 2>
            ...
            </mode>
            <mode = 3>
            ...
            </mode>
            ...
```

-continued

```
        </contents>
    </cmd>
```

The first line indicates a header representing that the information is described in the XML format. On the second line, "cmd" indicates the start of the command. A name space is designated by "xmlns" to designate the definition of interpretation of the command. Note that </cmd> on the last line indicates the end of the command.

The third line indicates a declaration of describing contents thereafter, and the contents are continuously described up to </contents>. The fourth line indicates a device ID. In this example, the model name of the printer 112 is "Printer001". The fifth line is not used in this embodiment. This will be described in detail in the next embodiment. On the sixth line and subsequent lines, the respective modes of the printer 112 are described. Information in one mode is described between <mode> and </mode>. On the sixth line, the number of a mode is 1. After that, <media> describes the type of printing paper, <size> describes a paper size, <quality> describes the print quality, and <border> describes bordered/borderless information. On the 11th line, <dpi> represent an input resolution, the input resolution in the horizontal direction is 1200 [dpi], and the input resolution in the vertical direction is 1200 [dpi]. The input resolution will be described in detail later.

On the 13th line and subsequent lines, information about mode 2 as another mode is described. In this way, the model name of the printer 112 and all the modes supported by the printer are described in the XML data. Note that a method of describing printer information is not limited to this. The printer information may be described in another format such as a binary format or a text format which is not a tag format.

In the above example, the information of the print function of the printer is transferred. However, the present invention is not limited to this. For example, information about image processing and analysis processing processable by the printer, the presence/absence of a silent print mode, the presence/absence of the use of a memory card, and a status such as the remaining ink amount may be transferred. Examples of image processing are color conversion such as monochrome conversion, sepia conversion, and chroma enhancement, multiple image layout, white balance correction, noise reduction, and processing of automatically correcting a photo to desirable colors and brightness.

In step S907, the CPU 100 receives the printer information from the printer 112. In the native layer, the CPU 100 obtains, from the received printer information, terms of the type and size of printing paper, the print quality, and bordered/borderless, and a term count in each of all the modes of the printer 112.

In step S908, the CPU 100 converts the received printer information into a format interpretable in the script layer 217, and transmits the converted information to the script layer 217. That is, the CPU 100 transfers the information obtained by communication with the printer 112 to the script layer 217. More specifically, a native function is provided, and the binding function is used. The printer information may be transmitted in the XML format just as it has been received or transmitted after converted into a text format without tag. Every time a specific native function is invoked from the script layer 217, information may be obtained as its return value. Alternatively, a mode to be obtained or the like may be given to the native function as an argument, and information may be obtained as its return value. In addition, the information may be transferred by using the above-described JSON character string, or transferred by a character string such as base64 by using the data conversion units 207 and 203.

In step S909, the CPU 100 forms a setting screen (FIG. 13) including functions usable by the printer 112 based on the printer information received from the native layer 218, and displays the setting screen. This is also called display control. If there are a plurality of connectable printers, a display screen for displaying printer names and prompting the user to select a printer for printing before the setting screen 1301 is displayed is generated. The CPU 100 displays the setting screen of the selected printer using the printer information corresponding to the selected printer. Note that a printer selection method is not limited to this, and a method of selecting a printer which responds earliest, a method of selecting a printer having more functions, a method of selecting a printer with not so many print jobs, or the like may be used.

As described above, the CPU 100 displays the setting screen 1301 (FIG. 13) for prompting the user to select functions usable by the printer, such as the type and size of printing paper, the print quality, and bordered/borderless. As an example of a method of forming a setting screen, a sample of an HTML description is given by:

```
<!DOCTYPE html>
    <head>
        <title>print setting</title>
        <script>
            <!-- paper size -->
            var PaperSizeNum = GetPaperSizeNum( );
            var p = document.getElementById("PaperList");
            var i;
            for(i=0; i<PaperSizeNum; i++){
                p.options[i] = new Option(GetPaperSize(i), GetPaperSize(i));
            }
            <!-- paper type -->
            var MediaTypeNum = GetMediaTypeNum( );
            var m = document.getElementById("MediaList");
            var j;
            for(j=0; j<MediaTypeNum; j++){
                m.options[i] = new Option(GetMediaTypeT(j), GetMediaTypeV(j));
            }
            <!-- print quality -->
            var QualityNum = GetQualityNum( );
            var q = document.getElementById("QualityList");
            var k;
            for(k=0; k< QualityNum; k++){
                q.options[i] = new Option(GetQualityT(k), GetQualityV(k));
            }
            <!-- bordered/borderless -->
            var BorderNum = GetBorderNum( );
            var b = document.getElementById("BorderList");
            var l;
            for(l=0; l<BorderNum; l++){
                b.options[i] = new Option(GetBorderT(l), GetBorderV(l));
            }
            <!-- print function -->
            function printer( ) {
                SetPrint(document.getElementById("PaperList").value,
                        document.getElementById("MediaList").value,
                        document.getElementById("QualityList").value,
                        document.getElementById("BorderList").value);
            }
        </script>
    </head>
        <!-- display unit -->
```

-continued

```
<body>
    paper size <select id="PaperList"></select><br/>
    paper type <select id="MediaList"></select><br/>
    print quality <select
id="QualityList"></select><br/>
    bordered/borderless <select
id="BorderList"></select><br/>
    <br/>
    <button id="btn1" onclick="printer( )">setting
completion</button>
    </body>
</html>
```

In the above sample, GetPaperSizeNum( ), GetMediaTypeNum( ), GetQualityNum( ), and GetBorderNum( ) are native functions, and each native function has a function of obtaining an item count. For example, paper sizes supported by the printer are A4, A5, B5, and L size, GetPaperSizeNum( ) returns 4.

Also, GetPaperSizeT(n), GetMediaTypeT(n), GetQualityT(n), and GetBorderT(n) are native functions, and each function returns the nth character string corresponding to the argument n. For example, the return value of GetPaperSize (0) as a function of returning text of the paper size is "A4", and the return value of GetPaperSize(1) is "A5". These values are extracted by the native function from the printer information received from the printer.

GetPaperSizeV(n), GetMediaTypeV(n), GetQualityV(n), and GetBorderV(n) are also native functions, and each function returns the character string corresponding to the argument n. For example, the return value of GetMediaTypeT(0) as a function of returning text of the paper type uses words, for example, "glossy paper" to be displayed and presented to the user. On the other hand, the return value of GetPaperTypeV(0) is a representation, for example, "GlossyPaper", interpretable by a printer.

These words and representations are determined in the native layer in association with the information sent from the printer. For example, if a value extracted from information sent from the printer is "GlossyPaper", the text to be displayed is determined as "glossy paper". As a determination method, the native layer holds a correspondence table in advance and determines texts based on the correspondence table.

Note that as an example, the paper size, paper type, print quality, and bordered/borderless settings are made. The present invention, however, is not limited to this. As another example, other setting items such as double-sided/single-sided, color/monochrome, and ON/OFF of image correction are set, as a matter of course. Furthermore, as described above, not only the print function but also information about image processing and analysis processing processable by the printer, the presence/absence of a silent mode, the presence/absence of the use of a memory card, and a status such as the remaining ink amount may be displayed.

Figure 13:
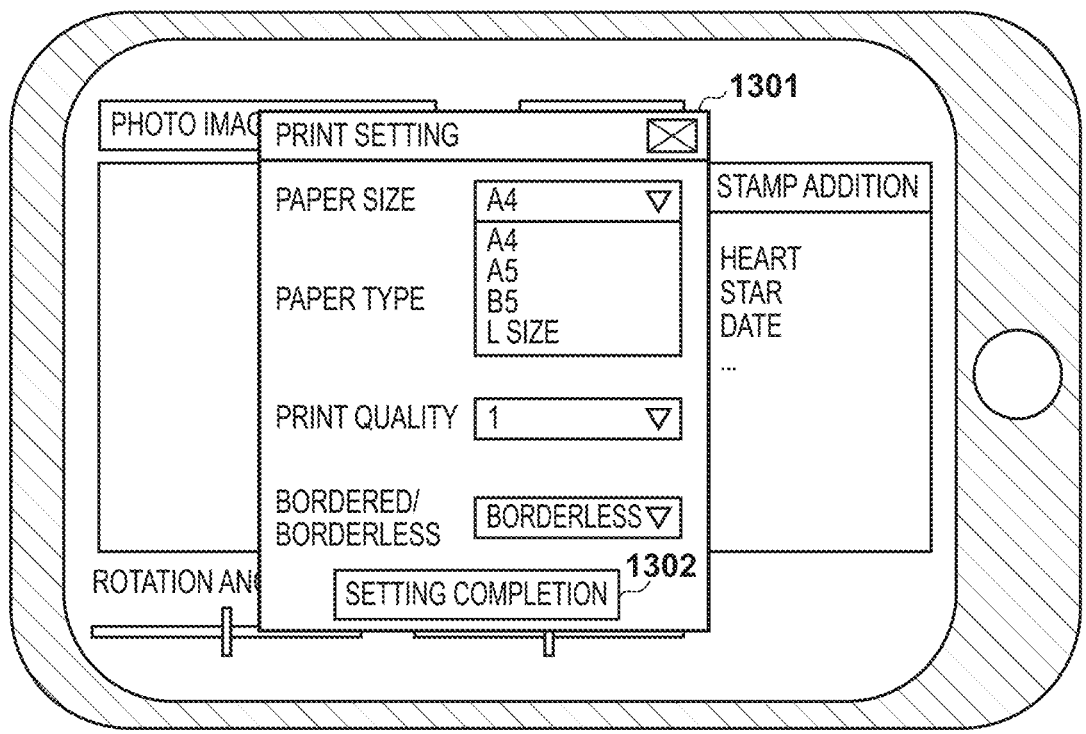
FIG. 13 is a view showing an example of a setting screen.

In step S910, the CPU 100 selects a function to be set in the printer based on a user operation on the setting screen 1301. The setting screen 1301 shown in FIG. 13 is an example in which the HTML of the above example is displayed on the display 104 using the rendering unit 216. The printer information is requested via the native layer 218, thereby forming the setting screen 1301 based on the information obtained from the printer information by using the above native function. Note that the HTML can be formed either in the script layer 217 or in the native layer 218.

Furthermore, each setting item such as the paper size shown in FIG. 13 is provided as a pull-down menu, and each item can be selected by a user operation. The setting screen 1301 indicates a state in which a list of selectable items is displayed as a setting item of a paper size by a pull-down menu, and a paper size such as A4 or A5 can be selected by a user operation.

In step S911, upon detecting a user operation on the setting completion button 1302, the CPU 100 creates setting information including a setting item selected by the user operation and transmits the setting information to the native layer 218. In the above example of the HTML description, SetPrint( ) is also a native function having the binding function. In the above example, SetPrint( ) is used to transfer the paper size, paper type, print quality, and bordered/borderless settings as a character string to the native layer 218.

In step S912, the CPU 100 receives the setting information from the script layer 217 by the binding function. In the native layer 218, a print command is generated later based on the received setting information, print target image data, and the image data of the stamp according to the communication protocol of the printer 112. The print command is transmitted to the printer 112 via the printer communication unit 213.

<Details of Rendering Processing>

When the user presses the setting completion button 1302 of the setting screen 1301 shown in FIG. 13, rendering processing in step S27 of FIG. 3 starts. Details of the rendering processing in step S27 of FIG. 3 will be described with reference to FIG. 10.

Rendering according to this embodiment indicates converting content displayed on the UI into an image size (number of pixels) for printing. The content is the above-described image in which a photo image and a stamp are arranged. Since the number of pixels of an image used in printing is normally larger than the number of pixels of an image displayed on the UI, image enlargement processing is necessary for printing. Here, the enlargement processing is performed by drawing the content displayed on the UI as a larger image (number of pixels) in the same composition. In this embodiment, band rendering (division enlargement) processing is mainly executed in the script layer.

Figure 10:
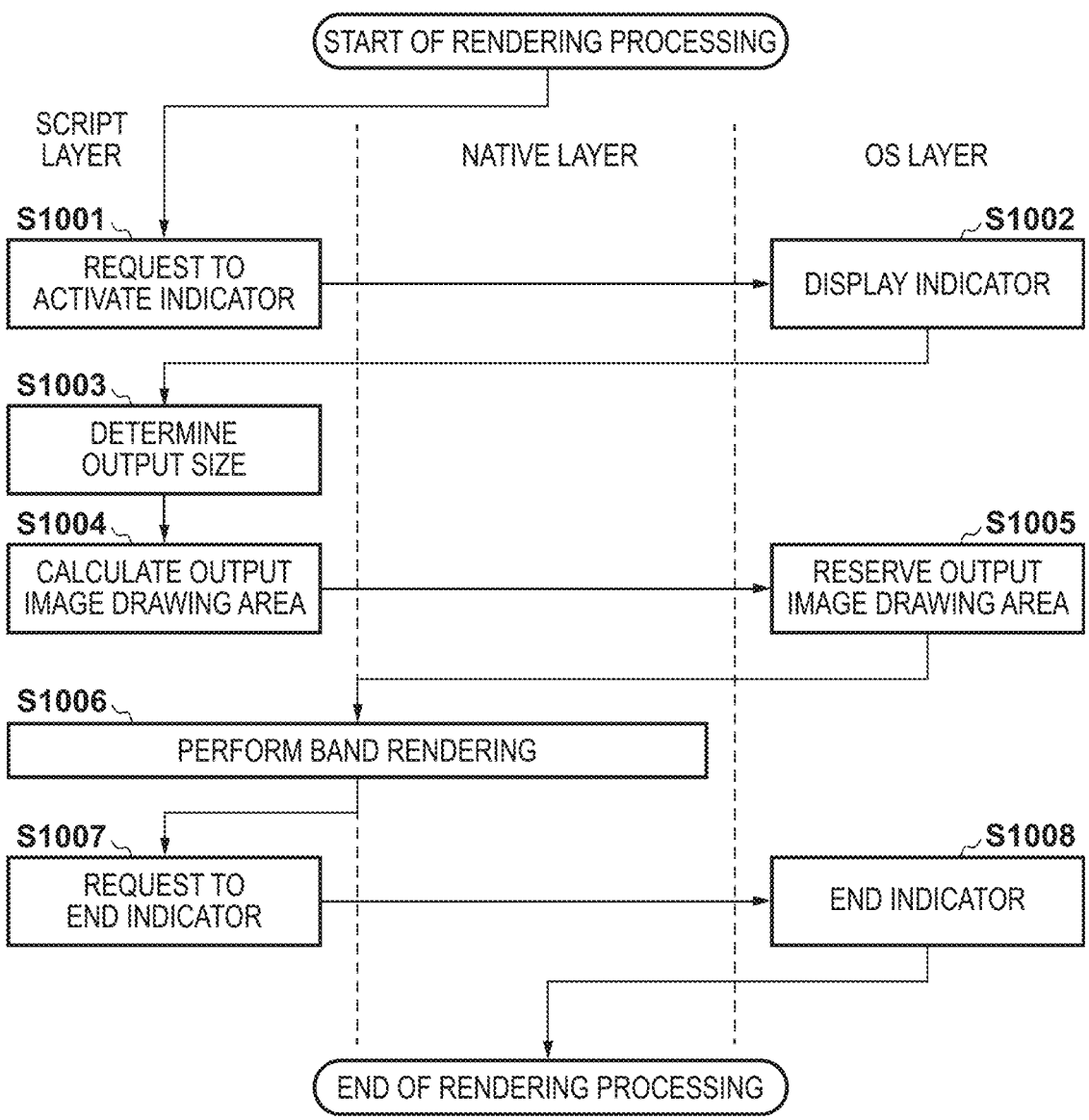
FIG. 10 is a flowchart illustrating details of rendering processing according to the first embodiment.

Note that steps S1001, S1003, S1004, and S1007 in FIG. 10 are processes executed by the CPU 100 using the program of the script layer 217. Steps S1002, S1005, and S1008 are processes executed by the CPU 100 using the program of the OS layer 219. Step S1006 is a process executed by the CPU 100 using the programs of the script layer 217 and the native layer 218.

In step S1001, the CPU 100 requests the OS layer 219 to activate an indicator. In step S1002, the CPU 100 displays, on the display 104, the indicator activated by the request. This allows the user to know that processing is being executed.

In step S1003, the CPU 100 determines an output size corresponding to the paper size set in the setting information determined in step S911. The output size is the number of pixels of the image. In this embodiment, the output size is calculated from an input resolution and a paper size in a print mode designated by the above setting. The input resolution is defined for each print mode of the printer 112, and image processing or quantization processing is performed in the number of pixels of the input resolution. In a case where image data having a size other than the input resolution is transferred to the printer 112, enlargement/reduction (resizing) is performed in the printer so as to obtain the input resolution.

An example of an output size calculation method will be described later assuming that the input resolution is 1,200 dpi, and the paper size is A4. Note that "number of input pixels [pixel]" corresponds to the output size, and the input resolution may change depending on the print mode set in the printer. The print mode is a setting provided by a paper type, quality, and the like. As another example, the output size may be defined for each paper size or calculated from a predetermined resolution. For example, the input resolution may be set to 300 dpi or the like, and the output size may be calculated using a paper size.

Note that in a case where image data of a size equal to or less than the input resolution of a print mode of the printer is transferred to the printer and printed, enlargement processing to the input resolution of the print mode is performed in the printer. However, in a case where the enlargement processing is executed using a known simple logic, a blur or jaggy occurs in a photo image or a line of an object such as a stamp in the printed image. A human eye recognizes it as degradation in image quality. To the contrary, if image data whose resolution is equal to or more than the input resolution of the print mode of the printer is transferred, the image data is reduced to the input resolution in the printer.

Hence, if the output size is determined based on the paper size and the input resolution of the print mode, as described above, the processing efficiency rises, and the quality of a resultant image is high.

In step S1004, the size of the drawing area of the output image is calculated.

The output image drawing area corresponds to one Canvas. The above-described each Canvas is rendered for the Canvas of the output size such that the sizes and the relative positions in the area match.

In this embodiment, the size of the output image drawing area is calculated based on the situation of the information processing apparatus on which the application operates. This aims at avoiding memory shortage in the information processing apparatus. For example, in a case where a printer having an input resolution of 1,200 dpi prints a paper size A4, the memory needs a capacity of 1.25 [GB]. A method of calculating a memory capacity is as follows.

size A4: 210 [mm]×297 [mm]

number of vertical pixels [pixel]=210 [mm]÷25.4 [mm/inch]×1200 [dpi]

number of horizontal pixels [pixel]=297 [mm]÷25.4 [mm/inch]×1200 [dpi]

number of input pixels [pixel]=number of vertical pixels [pixel]×number of horizontal pixels [pixel]

necessary memory capacity [Byte]=number of input pixels [pixel]×3 [channel]×8 [bits]≈417.6 [MB] (in case of binary data)

In this case, 3 [channel] indicates that each pixel of image data is expressed by three, R, G, and B components. This is rewritten as 4 [channel] if each pixel of image data is expressed by four, Y, M, C, and K components. In addition, 8 [bits] indicates that each color component of a pixel is expressed by an 8-bit value ranging from 0 to 255.

If all 8-bit values (0 to 255) are treated as 3-digit character strings, the necessary memory capacity (character data) is 417.6 [MB]×3 [characters]≈1.25 [GB].

Figure 14:
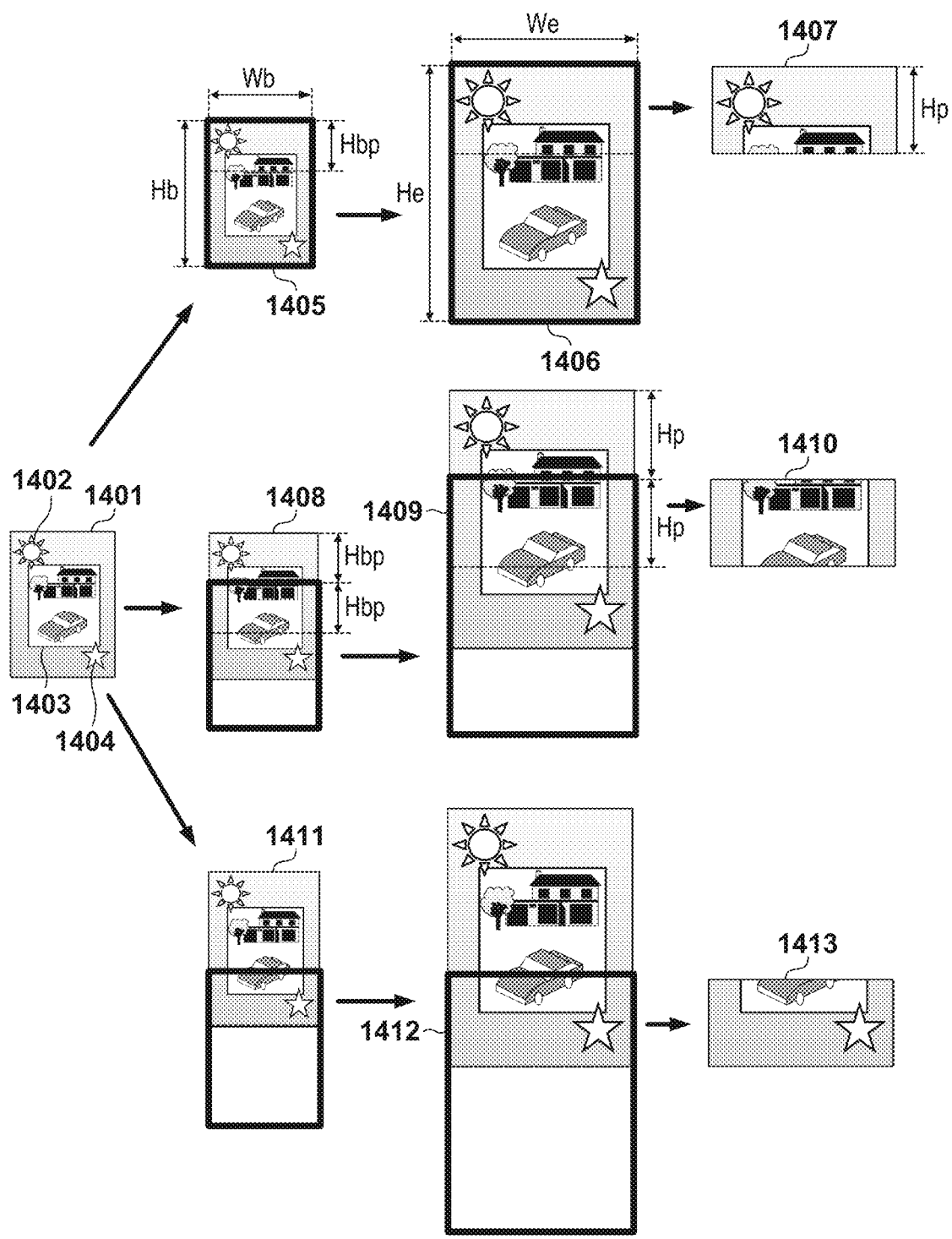
FIG. 14 is a schematic view conceptually showing band rendering.

As a method of determining the size of the output image drawing area, for example, memory reservation is attempted. If the memory cannot be reserved, the amount to reserve is decreased, and reservation is retried. This procedure is continued until the memory is reserved. The memory reservation is done by setting the width (x direction) and height (y direction) by setAttribute of Canvas and reserving an area by getContext. The above-described attempt of memory reservation is made by fixing the width to the width of a whole image to be output to the printer while decreasing the height. This makes it possible to divide the whole image to be output into bands, as shown in FIG. 14.

Note that in this embodiment, the width is fixed, and the image is divided into bands in the height direction. However, the present invention is not limited to this. For example, an image may be divided into squares or in the horizontal direction. In general, a printer prints an image sequentially from the upper side to the lower side. Hence, it is desirable to divide image data to be input to the printer into bands in the horizontal direction in correspondence with the print order. In this way, as division enlargement processing (to be described later) progresses, image data can divisionally be transmitted to the printer, and the time up to the end of printing can be shortened. Dividing an image into bands and performing rendering (enlarging and drawing image data in accordance with the input resolution of a printer) by the above-described processing is called band rendering.

Note that the method of determining the size of the output image drawing area is not limited to the above-described method. For example, the memory capacity may be determined in advance to a value expected to reliably avoid memory shortage or determined to a capacity that can prevent rendering processing from causing a delay in printing.

In this embodiment, the size of the output image drawing area is determined in the above-described way, thereby preventing memory shortage in the script layer.

In step S1005, the CPU 100 reserves the calculated output image drawing area in the RAM 102.

In step S1006, the CPU 100 performs band rendering. Note that actual rendering processing is executed by the interpreter of the OS layer 219 upon receiving an instruction from the script layer. Here, script's using a function of the OS is also expressed as execution in the script layer. At this time, the photo image is drawn in the output image drawing area reserved in step S1005. In step S1006, the CPU 100 interprets the script of the photo image drawing request and renders the photo image. Image drawing is performed in the OS layer 219 using the drawImage method of the Context object of Canvas. Note that drawing here indicates outputting image data to a memory space reserved as the output image drawing area but not displaying an image on the display 104. In this embodiment, the band rendering method is used to divisionally draw the image in step S1006. Details will be described below.

FIG. 14 is a view schematically showing the relationship between band rendering and an image output to the drawing area.

Referring to FIG. 14, reference numeral 1401 denotes a Canvas image displayed on the UI; 1402 and 1404, stamps arranged based on a user instruction; and 1403, a photo image selected by the user. Note that a photo image used for enlargement is not the image displayed on the UI but an original image read from an opened image file. As described above, an image that has undergone reduction processing is displayed on the UI in some cases. The information of the original image is lost in the reduced image, and the lost information cannot be restored by enlargement. For this reason, not the image on the UI but the image maintaining the image size read from the file is used for enlargement. Note that if image processing such as correction is performed as described above, an image obtained by performing the image processing for the image read from the opened image file is used for enlargement. In this example, an image obtained in step S304 of FIG. 4 and rasterized into an RGB image in step S305 is received from the native layer 218, and the script layer 217 performs enlargement processing for the image.

Some images such as stamps are held as vector data. Vector data is created as an image at the time of drawing, and its quality does not degrade when drawn after enlargement in Canvas. However, a stamp drawn as bitmap data once or a stamp of image data other than vector data is the same as a photo image. In this case, like the above-described photo image, not an image displayed on the UI but source data having a resolution as high as possible is used.

In this embodiment, the Canvas image 1401 is enlarged to an input resolution (number of pixels) required by the printer 112. The Canvas image 1401 before enlargement has the same size as an image 1405, and has a width Wb [pixel] and a height (vertical length) Hb [pixel]. An image 1406 after enlargement has a width We [pixel] and a height (vertical length) He [pixel]. Reference numerals 1407, 1410, and 1413 denote output image drawing areas having the same size, each of which has the width We [pixel] and a height (vertical length) Hp [pixel].

As described above, since the number of pixels of the enlarged image increases, memory shortage readily occurs. Hence, in the example shown in FIG. 14, the image data after enlargement is divided into three parts and held or transmitted to an external device (for example, printer). That is, an example in which a memory capable of storing ⅓ the capacity of image data after enlargement processing can be reserved as the output image drawing area will be explained here. Note that in this embodiment, the enlarged image is divided into three parts for the sake of simplicity. However, the present invention is not limited to this, and the output image drawing area and the number of divisions are actually determined in accordance with the state of the memory in the execution environment.

Band rendering processing as an example of division enlargement will be described next with reference to a flowchart.

Figure 15:
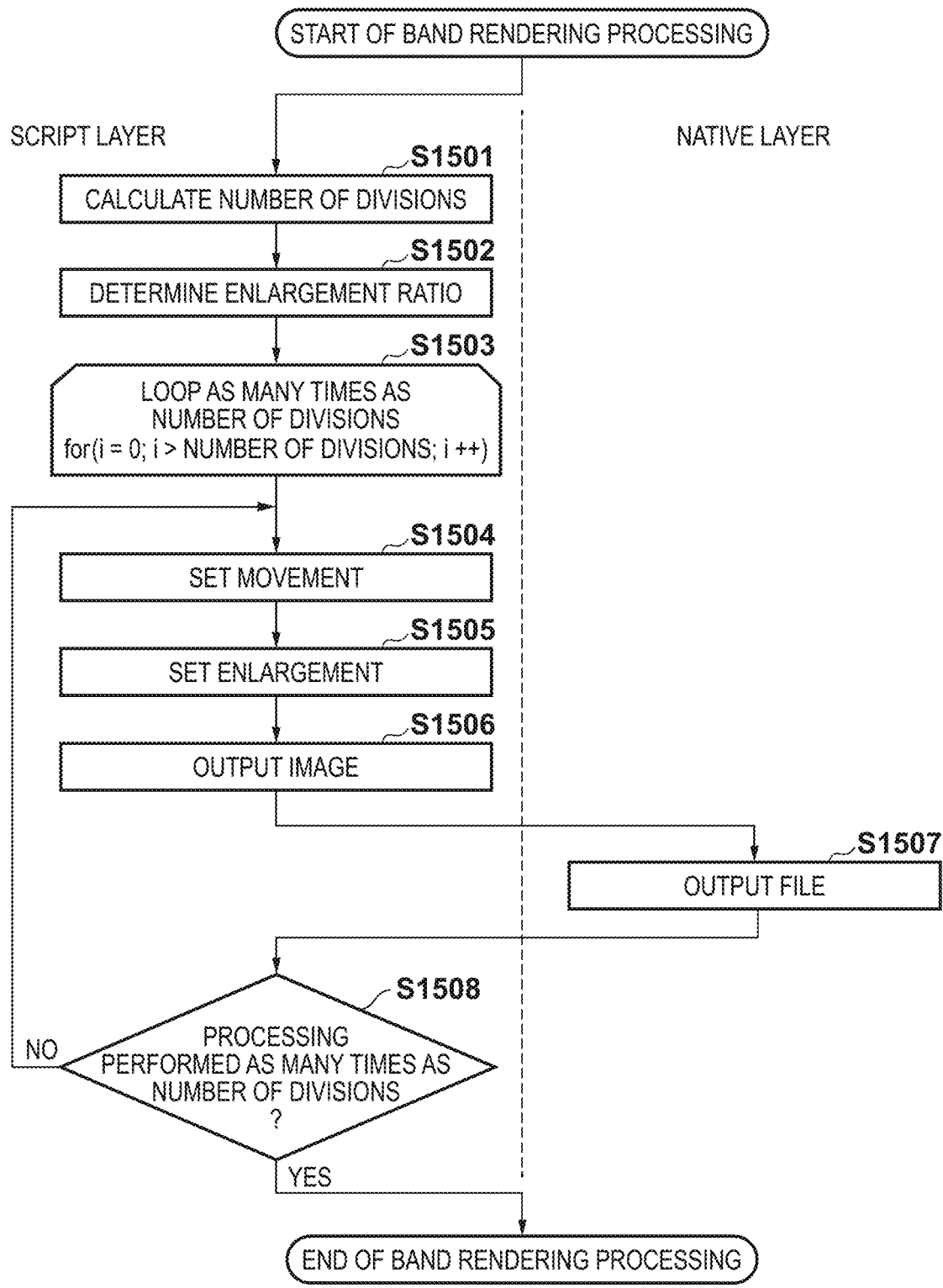
FIG. 15 is a flowchart illustrating details of band rendering according to the first embodiment.

FIG. 15 is a flowchart illustrating details of band rendering processing. Note that in FIG. 15, steps S1501 to S1506 and S1508 are processes in which the CPU 100 executes the program of the script layer 217, and step S1507 is a process in which the CPU 100 executes the program of the native layer 218.

In step S1501, the number of divisions is calculated. The number of divisions is determined by:

number of divisions=$He$ [pixel]/$Hp$ [pixel]

Fractions below the decimal point are rounded up, where Hp is the height of the output image area calculated in step S1004.

In step S1502, the enlargement ratio is determined.

The enlargement ratio is the ratio of the size of the image 1406 to the size of Canvas (image 1401 or 1405) displayed on the UI, and is given by:

Scale$W$(horizontal magnification)=$We/Wb$

Scale$H$(vertical magnification)=$He/Hb$.

In step S1503, "0" is substituted into a variable i, and loop processing is executed as many times as the number of divisions.

In step S1504, the moving amount of the stamps 1402 and 1404 and the photo image 1403 included in the image 1401 is set. The movement is translation to the upper side, and the moving distance is Hbp×i. Since i=0 for the first time, movement is not performed. Details of movement will be described later.

In step S1505, the enlargement ratio is set. In this embodiment, the enlargement ratio is set using the scale( ) method of Canvas in the following way.

scale(ScaleW, ScaleH);

In step S1506, the output image drawing area is output.

In this embodiment, image data is output to the output image drawing area by the drawImage( ) method of Canvas. At this time, the image 1406 cannot completely fit in the output image drawing area 1407. For this reason, in drawImage( ) the image data is output to the output image drawing area from the upper end of the image 1406, and the output ends upon reaching the lower end of the output image drawing area. Hence, the image of the upper portion cut from the dotted line of the image 1406 is output to the output image drawing area 1407.

In step S1507, the image data in the output image drawing area is output to a file. In this case, the script layer 217 outputs the image data to the file via the native layer 218. In this embodiment, the output format is the RGB bitmap format. Since the location to save the file is the secondary storage device 103, the memory (RAM 102) is not directly affected in terms of capacity. Hence, no problem arises concerning shortage of the memory (RAM).

The script layer invokes a function from the native layer using the binding function. At this time, the numbers of vertical and horizontal pixels of the image data to be saved are also transferred as arguments. The native layer saves the image data corresponding to the transferred number of vertical pixels×number of horizontal pixels in a file. Since a numerical value is held in the script layer as a character string, as described above, the image data is converted into binary data and saved in the file in the native layer.

Note that in the above example, the image data is saved as a file in the secondary storage device 103. However, the present invention is not limited to this. For example, the image data may be saved in a memory card, an external storage device, a server, or a cloud system via the Internet. In addition, although the script layer 217 cannot reserve a large capacity in the memory because of the restrictions of the OS, the native layer 218 may treat a large-capacity memory. In this case, the image data that has undergone division enlargement may be held in the memory (RAM) managed by the native layer 218.

In step S1508, it is checked whether or not the processing has been performed as many times as the number of divisions. In a case where it is judged that the processing has not been performed as many times as the number of divisions, the value i is incremented by "+1", and the process returns to step S1504. In a case where it is judged that the processing has been performed, the band rendering processing ends.

Enlargement of the central portion output in three divisions will be described next. This processing corresponds to the second loop processing (i=1).

In step S1504, the moving amount of the stamps 1402 and 1404 and the photo image 1403 included in the image 1401 is set. The movement is translation to the upper side, and the moving distance is Hbp×i. Here, the translate( ) method of Canvas is used for movement. In this case, Hbp is the height of each of three divided parts of the image 1401, and can be given by $Hbp=Hp \times Hb/He$ Reference numeral 1408 in FIG. 14 indicates a virtual image in a case where translation is thus set. The thick line frame indicates a range output in Canvas, and the portion outside the thick line frame is not output (or drawn). In this example, a setting is done to translate the image 1401 upward by Hbp, as indicated by 1408 in FIG. 14.

In step S1505, the enlargement ratio is set by the scale( ) method of Canvas, as in the enlargement of the above-described upper portion. The enlargement ratio is the same as that for the above-described upper portion. Reference numeral 1409 in FIG. 14 indicates a virtual image in a case where enlargement is performed using the enlargement ratio. When the image is slid upward, as indicated by 1408 in FIG. 14, and the enlargement ratio is set by the scale( ) method, the image after enlargement is translated upward by Hp. Note that although the settings are done in the order of movement and enlargement, they may be done in the order of enlargement and movement. The moving amount at that time is set to a value according to the image after enlargement (Hp in this example).

In step S1506, the image data is output to the output image drawing area by the drawImage( ) method of Canvas, as described above. As described above concerning steps S1406 and S1407 of FIG. 14, only the portion above the dotted line in the thick line frame indicated by 1409 in FIG. 14 is output to the output image drawing area. The output result is indicated by 1410 in FIG. 14, which is the central portion of the three divisions.

Like the upper portion, the output result is sent to the native layer and output to a file in step S1507.

Enlargement of the lower portion output in three divisions will be described next. This processing corresponds to the third loop processing (i=2).

In step S1504, a setting is done to translate the original image 1401 of Canvas upward using the translate( ) method, like the above-described central portion. The translation distance is Hbp×2. The moving amount is Hbp×2 because an image corresponding to the height Hbp in the original image has already been enlarged and output when outputting the upper portion, and another image corresponding to the height Hbp in the original image has already been enlarged and output when outputting the central portion. Reference numeral 1411 in FIG. 14 virtually shows the state of translation.

In step S1505, an enlargement setting is done using the scale( ) method, like the above-described central portion. Reference numeral 1412 in FIG. 14 virtually shows the state of enlargement.

In step S1506, the image data is output to the output image drawing area by the drawImage( ) method of Canvas, like the above-described central portion. As described above, only the portion above the dotted line in the thick line frame indicated by 1412 in FIG. 14 is output to the output image drawing area. The output result is indicated by 1413 in FIG. 14, which is the lower portion of the three divisions. Like the upper and central portions, the output result is output to a file in step S1507.

An example of three divisions has been described above. However, the arrangement can cope with other cases. For example, the height of the lowermost portion of divided images may be less than the height Hp of the output image drawing area, that is, it may be impossible to divide an image without a remainder. In this case as well, translation, enlargement, and output are performed as described above. At this time, no image exists in the lower portion of the output image drawing area where the lowermost portion is output. When this output result is saved in a file in the native layer 218, the area without any image is omitted.

In step S1007, the CPU 100 requests the OS layer 219 to stop the indicator. In step S1008, the CPU 100 stops the indicator, and removes the indicator displayed on the display 104.

<Details of Print Processing>

Figure 11:
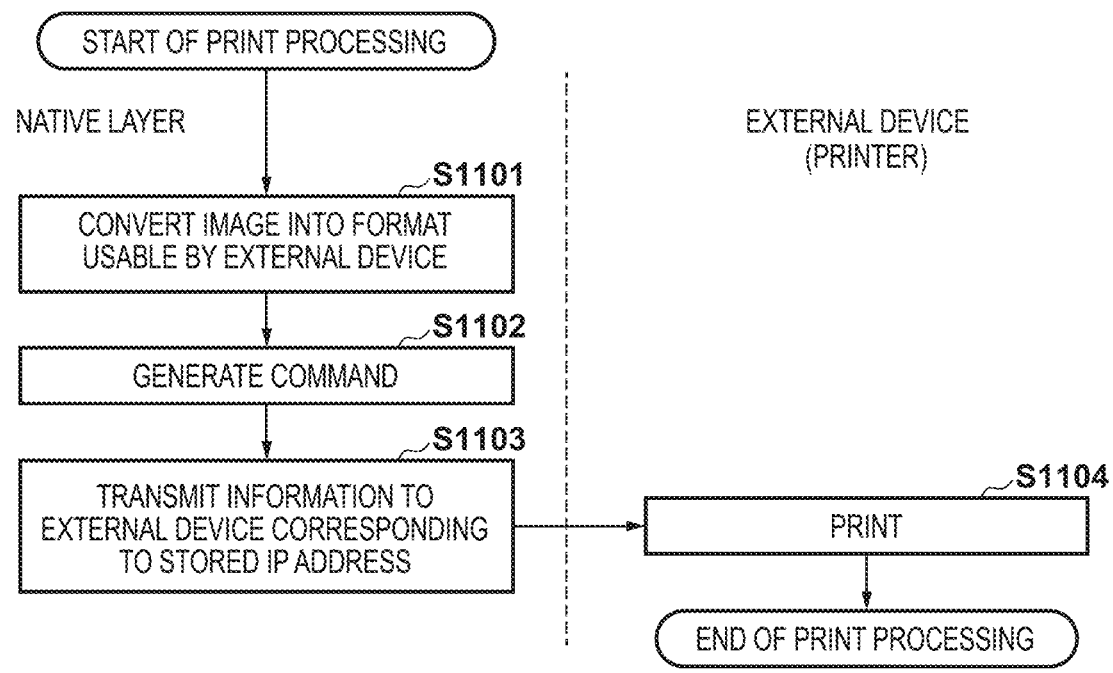
FIG. 11 is a flowchart illustrating details of print processing.

In step S28 of FIG. 3, print processing is executed using rendered image data. Details of print processing in step S28 of FIG. 3 will be described here with reference to FIG. 11. Note that steps S1101 to S1103 shown in FIG. 11 are processes executed by the CPU 100 using the program of the native layer 218, and step S1104 is a process executed on the printer side.

In step S1101, the CPU 100 performs division enlargement by band rendering in step S1006 of FIG. 10, and converts the RGB image of each band saved as a file into a format usable by the printer 112. Formats usable by the printer include not only RGB, JPEG, and CMYK but also an original format of a printer vendor such as PDF. Any of these formats can be used here.

In step S1102, the CPU 100 generates commands to be transmitted to the printer 112 based on the setting information and the image data converted in step S1101. Each command includes an image format, the number of pixels (We and Hp in FIG. 14) of each image, and image data. The first command to be sent to the printer 112 includes the number of pixels (We and He in FIG. 14) of the entire image. In step S1103, the CPU 100 sequentially transmits the commands of the plurality of bands generated in step S1102 to the printer 112 selected by the user in accordance with the communication protocol usable by the printer. With the above-described processing, output processing using the commands (a plurality of image data) of the plurality of bands is implemented.

The printer 112 accumulates the images to be sent as commands in the internal memory of the printer 112. The printer 112 waits until all images are received. When all images are received, the printer 112 combines them to form one image to be output. Note that after one image data is generated using the files of RGB images of bands, the image data may be converted into a format usable by the printer. However, this can be done only when the native layer can use a memory to perform the processing.

In step S1104, the printer 112 executes printing of the combined image.

Note that in the above example, the printer 112 waits the print operation until all images are received. However, printing may be executed every time a divided image is received. If next image data sent as a command is received while performing printing, the time up to the end of printing can be shortened. In the above example, each image that has undergone division enlargement is temporarily saved as a file. However, the images may be sequentially transmitted to an external device (for example, printer) without being saved. This makes it possible to shorten the time up to the end of printing or perform printing without accessing the secondary storage device.

Hence, according to the above-described embodiment, even in the environment of a hybrid application where memory shortage occurs in the script layer, and image data enlargement processing cannot be performed, enlargement can be performed by dividing image data. This enables printing of a high-quality image.

Second Embodiment

An example in which division enlargement (band rendering) is wholly performed in the native layer will be described. In this embodiment, steps shown in FIG. 3 are implemented as in the above-described first embodiment, and many processes are the same as in the first embodiment. For the sake of simplicity, a description of portions common to the first embodiment will be omitted, and only portions characteristic to this embodiment will be explained here.

Only rendering in step S27 of FIG. 3 is characteristic to this embodiment. In the first embodiment, many steps of rendering are processed in the script layer 217 and the OS layer 219 requested from the script layer 217. In this embodiment, however, rendering is performed in the native layer 218, thereby implementing fast processing.

Figure 16:
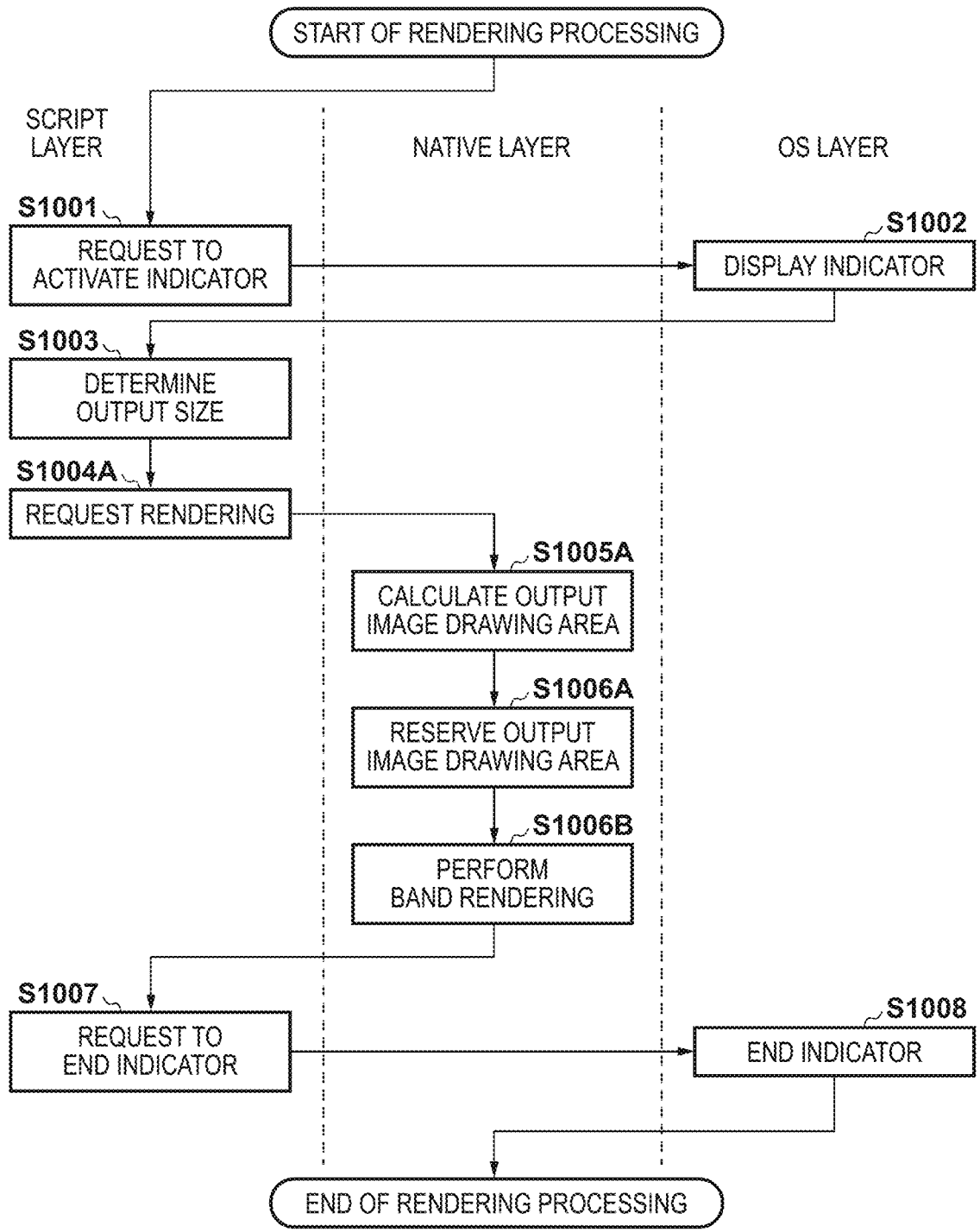
FIG. 16 is a flowchart illustrating details of rendering according to a second embodiment.

FIG. 16 is a flowchart illustrating rendering processing according to the second embodiment. Note that the same step numbers as described in the first embodiment with reference to FIG. 10 denote the same steps in FIG. 16, and a description thereof will be omitted. In FIG. 16, steps S1001, S1003, and S1004A are processes in which the CPU 100 executes the program of the script layer 217, and steps S1002 and S1008 are processes executed by the CPU 100 in the OS layer 219. Steps S1005A, 51006A, and 51006B are processes in which the CPU 100 executes the program of the native layer 218.

After steps S1001 to S1003, the CPU 100 requests the native layer 218 to perform rendering in step S1004. At this time, an object such as a stamp that holds an image as vector data is enlarged and drawn in the script layer 217. The drawn image data of a stamp and the like are transferred to the native layer 218 in the base64 format and converted into binary data in the native layer 218. At this time, the stamps are drawn one by one. After one image data is transferred to the native layer 218 and converted into binary data in the native layer 218, the next stamp is drawn. This makes it possible to hold only one image as character string data.

As described above, in a case where image data is held as character string data, a large memory capacity is needed as compared to binary data. Hence, the memory capacity to use can be decreased by the above processing. Note that the native layer 218 may temporarily save the received image data as a file in a secondary storage device and open the file when using it. This can decrease the memory capacity to temporarily use.

In this example, position information of each object (for example, photo image or stamp) is sent from the script layer 217 to the native layer 218. Position information represents the relative position, size, and order of superimposition of each object similar to the arrangement displayed on the UI. The position information is interpreted in the native layer 218, and the position and size of each object after enlargement are determined.

In step S1005A, the capacity of the output image drawing area is calculated. Although this processing is basically the same as in step S1004 of FIG. 10, the following restrictions are provided in this example.

In printer information received from a printer 112 as an external device, <memory receive=7680000/> is described in the fifth line of the above-described XML, as described in the first embodiment. This indicates that the maximum data amount that the printer 112 can receive at once is 7,680,000 [Byte] (=7.68 [MB]). Hence, the capacity of the output image drawing area needs to be equal to or less than the numerical value. In fact, since a header and a footer are added before and after the image data and transmitted to the printer 112, the image area has a capacity smaller than the above value by the header and the footer. Not the receivable maximum data amount but the size of an image that the printer can rasterize into RGB data and hold it may be obtained from the printer to determine the capacity of the drawing area (to be described later).

In step S1006A, the output image drawing area is reserved. A drawing area as much as the capacity calculated in step S1005A is reserved in the memory area managed by the native layer 218. In step S1006B, band rendering is executed. Details will be described later.

The subsequent processing is the same as that described in the first embodiment with reference to FIG. 10.

FIG. 17 is a flowchart illustrating details of band rendering processing according to the second embodiment. This band rendering is executed in the native layer 218. As can be seen from comparison of FIGS. 17 and 15, the same processing as that executed in the script layer 217 in the first embodiment is executed in the native layer 218 in the second embodiment. Hence, only portions characteristic to the second embodiment will be explained here.

In step S1701, the number of divisions is calculated, as in step S1501. The number of divisions is determined by the size of the output image drawing area. The size is determined based on a value included in printer information received from the printer 112 as an external device. Hence, the number of divisions can also be said to be determined based on the value received (or designated/instructed) from the external device.

In step S1702, the enlargement ratio and the position of each image are determined. In this case, a ratio to convert the size of a photo image opened from a file into a size of input to the external device is calculated. The above-described position information is used for the calculation. Note that an expression "enlargement ratio" is used here, the ratio may be less than 1, and reduction may be performed. As a position, a position after division enlargement is obtained based on a variable i and the position information. The arrangement of image data of each stamp other than the photo image is also calculated from the position information. The stamp images are enlarged in the script layer 217 and need not be enlarged in the native layer 218. In addition, in a case the native layer 218 has a function to interpret and to draw vector data like the stamp image, even if the enlarging processing is performed in the native layer 218 by using the function, data of the same imaging quality is obtained.

In step S1703, loop processing based on the number of divisions starts, as in step S1503.

In step S1704, the CPU 100 rasterizes and arranges the image data in the output image drawing area while enlarging it based on the determined enlargement ratio and position information, and composites the image data in accordance with the order of superimposition. At this time, the stamps are also arranged and composited in a similar manner but need not be enlarged.

In step S1705, the division-enlarged image output to the output image drawing area is transmitted to the external device (printer 112) as needed. At this time, the size of the image data is added to the header of the transmission data. Transmission is performed via the external device communication unit 221 complying with a protocol supported by the external device. Upon receiving the divided image, the printer 112 prints it as needed. When transmitting the next divided image, the native layer 218 queries the printer 112 whether or not it can receive the next divided image. In response to the query, the printer 112 notifies the native layer whether or not the printer can receive the next divided image. In the above-described way, transmission, reception, and printing of each divided image are executed as needed.

In step S1706, it is checked whether or not the band rendering has been performed as many times as the number of divisions. If the band rendering is incomplete, the process returns to step S1704. If the processing is completed, the band rendering processing ends.

Hence, according to the above-described embodiment, the data amount receivable by an external device is received, and the size of the output image drawing area is calculated and reserved in the memory in consideration of the amount as well. It is therefore possible to execute image data enlargement processing while preventing memory shortage. It is also possible to prevent memory overflow in the external device.

In addition, according to this embodiment, since enlargement processing is executed in the native layer, the image enlargement processing can be executed at a speed higher than in a case where a photo image is enlarged in the script layer, and the processing time can be shortened.

Note that in the present application, a command for a printer is transmitted in the native layer. However, the command may be transmitted in the OS layer.

Still Another Embodiment

The example of the information processing apparatus shown in FIG. 1 is hardware assuming a portable mobile computer (smartphone or tablet terminal). However, the present invention is not limited to this. For example, the same arrangement as described above can be implemented on hardware such as a desktop type personal computer, server, game machine, or digital camera.

Additionally, in the above embodiments, a printer has been exemplified as an external device. However, the present invention is not limited to this. For example, another smartphone, tablet terminal, PC, server, game machine, or the like is also usable as an external device.

Furthermore, in the above embodiments, as a method of drawing contents (a photo image or stamp image), the Canvas function of JavaScript® has been exemplified. A method of drawing contents is not limited to this. For example, it is possible to draw contents using SVG (Scalable Vector Graphics).

In the above embodiments, an example in which one image is selected from an image folder in the device has been described. However, the present invention is not limited to this. For example, an image may be selected by designating the absolute path of the data, designating a whole folder including the image, or shooting an image on the spot using the camera function of the device. As for the data obtaining destination, for example, an image on the Internet is selected, an image in a detachable storage medium is selected, or an image is obtained by communication with an external device.

In addition, as the printer according to each of the aforementioned embodiments, an inkjet printer, a laser printer, a dye-sublimation printer, a dot impact printer, or the like can be used. These printers may be so-called multifunction peripherals having not a single function but the printer function, the scanner function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation of U.S. patent application Ser. No. 14/743,459, filed on Jun. 18, 2015, and allowed on Feb. 9, 2017, which claims the benefit of Japanese Patent Application No. 2014-135179, filed Jun. 30, 2014, which are hereby incorporated by reference herein in their entireties.

What is claimed is:

1. An information processing apparatus for executing, by a processor, a program including a first program layer with an instruction set to be interpreted and executed by the processor and a second program layer with an instruction set compiled in advance by a unit other than the processor, comprising:

a display control unit configured to display a print setting screen provided by the program, on a display unit;

a generation unit configured to generate print data, based on print setting information set by using the print setting screen displayed on the display unit;

an obtaining unit configured to obtain information of a printing apparatus in a format interpretable in the first program layer; and a transmission control unit configured to transmit the print data to the printing apparatus, wherein the display control unit displays the print setting screen on the display unit, based on the information of the printing apparatus in the format interpretable in the first program layer, the first program layer uses image data of a text format, the second program layer uses image data of a binary format, and the display control unit, the generation unit, the obtaining unit and the transmission control unit are implemented by the processor.

2. The apparatus according to claim 1, wherein the first program layer has the display control unit.

3. The apparatus according to claim 1, wherein the instruction set in the first program layer is described by first description language, and
the instruction set in the second program layer is described by second description language.

4. The apparatus according to claim 1, wherein the program is a hybrid application.

5. The apparatus according to claim 1, wherein the information of the printing apparatus includes a size of a printing paper.

6. The apparatus according to claim 1, wherein the first program layer is described by at least one of HTML, CSS and JavaScript®.

7. The apparatus according to claim 6, wherein the second program layer is described by at least one of Java, C programming language and C++.

8. The apparatus according to claim 1, wherein the first program layer performs display processing using the image data of the text format.

9. The apparatus according to claim 1, wherein the second program layer performs drawing processing using the image data of the binary format.

10. A processing method of an information processing apparatus for executing, by a processor, a program including a first program layer with an instruction set to be interpreted and executed by the processor and a second program layer with an instruction set compiled in advance by a unit other than the processor, comprising:
displaying a print setting screen provided by the program, on a display unit;
generating print data, based on print setting information set by using the print setting screen displayed on the display unit;
obtaining information of a printing apparatus in a format interpretable in the first program layer; and
transmitting the print data to the printing apparatus,
wherein the print setting screen is displayed on the display unit, based on the information of the printing apparatus obtained in the format interpretable in the first program layer,
the first program layer uses image data of a text format, and
the second program layer uses image data of a binary format.

11. The method according to claim 10, wherein the displaying is provided in the first program layer.

12. The method according to claim 10, wherein the instruction set in the first program layer is described by first description language, and
the instruction set in the second program layer is described by second description language.

13. The method according to claim 10, wherein the program is a hybrid application.

14. The method according to claim 10, wherein the first program layer is described by at least one of HTML, CSS and JavaScript®.

15. The method according to claim 14, wherein the second program layer is described by at least one of Java, C programming language and C++.

16. The method according to claim 10, wherein the first program layer performs display processing using the image data of the text format.

17. The method according to claim 10, wherein the second program layer performs drawing processing using the image data of the binary format.

18. A processing method of an information processing apparatus for executing, by a processor, a program including a first program layer with an instruction set described by a first description language and a second program layer with an instruction set described by a second description language different from the first description language, comprising:
displaying a print setting screen provided by the program, on a display unit;
generating print data, based on print setting information set by using the print setting screen displayed on the display unit;
obtaining information of a printing apparatus in a format interpretable in the first program layer; and
transmitting the print data to the printing apparatus,
wherein the print setting screen is displayed on the display unit, based on the information of the printing apparatus obtained in the format interpretable in the first program layer,
the first program layer uses image data of a text format, and
the second program layer uses image data of a binary format.

19. The method according to claim 18, wherein the print setting screen is displayed on the display unit by the first program layer.

20. The method according to claim 18, wherein the program is a hybrid application.

21. The method according to claim 18, wherein the second program layer generates the print data.

22. The method according to claim 18, wherein the first description language includes at least one of HTML, CSS and JavaScript®.

23. The method according to claim 22, wherein the second description language includes at least one of Java, C programming language and C++.

24. The method according to claim 18, wherein the first program layer performs display processing using the image data of the text format.

25. The method according to claim 18, wherein the second program layer performs drawing processing using the image data of the binary format.

* * * * *